US011426944B2

(12) United States Patent
Frohnmaier et al.

(10) Patent No.: US 11,426,944 B2
(45) Date of Patent: Aug. 30, 2022

(54) SUPERVISION OF AN ADDITIVE MANUFACTURING PROCESS

(71) Applicant: EOS GmbH Electro Optical Systems, Krailling (DE)

(72) Inventors: Markus Frohnmaier, Hengersberg (DE); Marcus Schmidt, Munich (DE); Harald Krauss, Gersthofen (DE); Michael Sirch, Igling (DE)

(73) Assignee: EOS GmbH Electro Optical Systems, Krailling (DE)

( * ) Notice: Subject to any disclaimer, the term of this patent is extended or adjusted under 35 U.S.C. 154(b) by 80 days.

(21) Appl. No.: 16/480,899

(22) PCT Filed: Apr. 12, 2018

(86) PCT No.: PCT/EP2018/059380
§ 371 (c)(1),
(2) Date: Jul. 25, 2019

(87) PCT Pub. No.: WO2018/192833
PCT Pub. Date: Oct. 25, 2018

(65) Prior Publication Data
US 2019/0389137 A1    Dec. 26, 2019

(30) Foreign Application Priority Data

Apr. 21, 2017 (DE) .......................... 102017108534.3

(51) Int. Cl.
*B29C 64/393* (2017.01)
*B33Y 50/02* (2015.01)
(Continued)

(52) U.S. Cl.
CPC ........ *B29C 64/393* (2017.08); *B28B 17/0081* (2013.01); *B33Y 50/02* (2014.12);
(Continued)

(58) Field of Classification Search
CPC ... B29C 64/393; B29C 64/153; B29C 64/268; B33Y 50/02; B33Y 10/00;
(Continued)

(56) References Cited

U.S. PATENT DOCUMENTS

| 5,897,825 A | 4/1999 | Fruth et al. |
| 9,964,496 B2 | 5/2018 | Hess et al. |

(Continued)

FOREIGN PATENT DOCUMENTS

| DE | 102013212803 | 1/2015 |
| DE | 102014216567 | 2/2016 |

(Continued)

OTHER PUBLICATIONS

PCT Search Report for Application No. PCT/EP2018/059380 dated Aug. 1, 2018, 4 pages.

(Continued)

*Primary Examiner* — Thomas C Lee
*Assistant Examiner* — Ameir Myers
(74) *Attorney, Agent, or Firm* — Seyfarth Shaw LLP

(57) ABSTRACT

Disclosed is a method for supervision of an additive manufacturing process for producing a manufacturing product by selectively solidifying build-up material in a process chamber. The build-up material is irradiated according to pre-definable irradiation control data; and a process chamber supervisory data set is generated based on the irradiation control data, supervisory data being encoded process chamber point by process chamber point in said data set. Quality data concerning the manufacturing process are determined based on the process chamber supervisory data set. A description is further given of a supervisory device suitable therefor a control device for an apparatus for additive manufacturing of manufacturing products, and an apparatus (Continued)

for additive manufacturing of manufacturing products comprising such a control device.

13 Claims, 9 Drawing Sheets

(51) Int. Cl.
    *B28B 17/00*         (2006.01)
    *G05B 19/418*      (2006.01)
    *B22F 10/20*        (2021.01)
    *B22F 10/30*        (2021.01)

(52) U.S. Cl.
    CPC ........ *G05B 19/41875* (2013.01); *B22F 10/20* (2021.01); *B22F 10/30* (2021.01); *G05B 2219/49007* (2013.01)

(58) Field of Classification Search
    CPC .......... B28B 17/0081; G05B 19/41875; G05B 2219/49007; G05B 2219/49018; G05B 2219/49023; G05B 19/4093; B22F 10/20; B22F 10/30; B22F 3/008; B22F 3/1055; H01J 37/32963; G06F 30/00; G06F 2119/18
    See application file for complete search history.

(56) References Cited

U.S. PATENT DOCUMENTS

| | | | |
|---|---|---|---|
| 10,035,188 | B2 | 7/2018 | Weilhammer et al. |
| 10,043,257 | B2 | 8/2018 | Ladewig |
| 10,118,341 | B1 * | 11/2018 | Liu ........................ B33Y 30/00 |
| 10,690,494 | B2 * | 6/2020 | Deichmann ........ G01B 11/2513 |
| 2007/0175875 | A1 * | 8/2007 | Uckelmann ............. B22F 10/20<br>219/121.85 |
| 2009/0082993 | A1 * | 3/2009 | Li ....................... G01B 11/0625<br>702/155 |
| 2013/0168902 | A1 | 7/2013 | Herzog et al. |
| 2016/0054231 | A1 | 2/2016 | Hess et al. |
| 2016/0098825 | A1 | 4/2016 | Dave et al. |
| 2016/0167131 | A1 | 6/2016 | Weilhammer et al. |
| 2016/0184893 | A1 | 6/2016 | Dave et al. |
| 2016/0275670 | A1 | 9/2016 | Ladewig |
| 2016/0297148 | A1 | 10/2016 | Ladewig |
| 2016/0314354 | A1 * | 10/2016 | Teuton .................... G06F 16/48 |
| 2018/0043432 | A1 | 2/2018 | Domrose |
| 2018/0154484 | A1 * | 6/2018 | Hall ........................ B33Y 50/02 |
| 2018/0264553 | A1 | 9/2018 | Dave et al. |
| 2019/0022946 | A1 * | 1/2019 | Jones ..................... B33Y 30/00 |
| 2020/0034498 | A1 * | 1/2020 | Avdovic .................. G06F 30/00 |
| 2020/0038954 | A1 * | 2/2020 | Regulin ............... B23K 26/144 |

FOREIGN PATENT DOCUMENTS

| | | | |
|---|---|---|---|
| DE | 102015011013 | | 2/2016 |
| DE | 102015204800 | | 12/2016 |
| DE | 102015207254 | | 12/2016 |
| DE | 1020171069755 | * | 3/2017 |
| EP | 3082102 | | 10/2016 |
| WO | 9714549 | | 4/1997 |

OTHER PUBLICATIONS

Criales Luis E. et al: "Predictive modeling and optimization of multi-track processing for laser powder bed fusion of nickel alloy 625", Additive Manufacturing, Bd. 13, Jan. 1, 2017 (Jan. 1, 2017), pp. 14-36, XP055799909, NL, ISSN: 2214-8604, DOI: 10.1016/j.addma.2016.11.004, 23 pages.

* cited by examiner

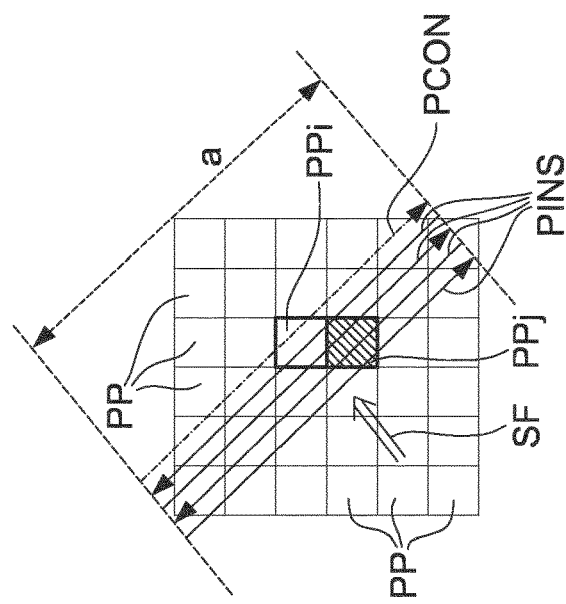

SUPERVISION OF AN ADDITIVE MANUFACTURING PROCESS

TECHNICAL FIELD OF THE INVENTION

The invention relates to a method for supervising an additive manufacturing process for production of a manufacturing product, in particular a three-dimensional manufacturing product, by selective solidification of build-up materials in a process chamber, wherein, for the purpose of solidification, the build-up material is irradiated in accordance with predefinable irradiation control data. The invention also relates to a method for controlling such an additive manufacturing process and to a use of irradiation control data which are used to control the irradiation of a build-up material in such a process. In addition, the invention relates to a supervisory device and to a control device for an apparatus for the additive manufacture of manufacturing products and to a corresponding apparatus for the additive manufacture of manufacturing products comprising such a control device.

BACKGROUND OF THE INVENTION

Additive manufacturing processes have become increasingly relevant in the production of prototypes and nowadays also in series production, Generally, "additive manufacturing processes" are understood to mean such manufacturing processes in which a manufacturing product or component part is constructed, generally on the basis of digital 3D construction data, by the deposition of material. The build-up is usually, but not necessarily performed layer by layer. A common synonym for additive manufacture is the term "3D printing"; the production of models, patterns and prototypes by means of manufacturing processes is often referred to as "rapid prototyping", and the production of tools as "rapid tooling". As mentioned at the outset, a central point is the selective solidification of the build-up material, wherein this solidification can be performed in many manufacturing processes with the aid of an irradiation with radiation energy, for example electromagnetic radiation, in particular light and/or heat radiation, but also with particle radiation, for example electron radiation, as appropriate. Examples of methods that operate with irradiation are "selective laser sintering" or "selective laser melting". Here, thin layers of a usually powdery build-up material are applied one on top of the other repeatedly, and the build-up material in each layer is selectively solidified by spatially limited irradiation of the points that, after manufacture, are intended to belong to the manufacturing product to be produced, by partially or completely melting the powder grains of the build-up material with the aid of the energy introduced locally at these points by the radiation. After cooling, these powder grains are then connected to one another in a solid body.

In order to continuously supervise the additive manufacturing process, it is possible, with the aid of a sensor, to detect the melt pool created by the energy input. This is also referred to as "melt pool monitoring". The detected signal is dependent here on the radiation emitted or reflected by the melt pool and can be correlated, amongst other things, with the strength of the energy input. Images of a larger region of the construction field or even the entire construction field can also be recorded and evaluated using an image sensor. This method of construction process monitoring is known, amongst other things, under the name "optical tomography". In both cases the signal can be used to determine the quality of the manufactured component part. In order to assess the component part quality, the sensor values detected in a spatially resolved manner, i.e. the sensor values linked to the corresponding coordinate values from which the sensor values were detected, can be presented for this purpose. This can be implemented for example by means of a visualisation device, for example on a display. Examples for using such a melt pool signal for supervising the manufacturing process are described in US 2013/0168902 A1, DE 10 2013 212 803 A1 and WO97/14549. Supervision with the aid of such a signal of a melt pool, however, is possible only during the manufacturing process and after the manufacturing process if appropriate signals were detected during the manufacturing process.

SUMMARY OF THE INVENTION

The object of the present invention is to provide a possibility, which is supplementary or alternative to the above-described method, for supervising an additive manufacturing process, and a method and an apparatus for the additive manufacture, in which this possibility for supervision is utilised.

This object is achieved on the one hand by a method (or supervisory method) according to claim 1, by a method for controlling an additive manufacturing process according to claim 10, and the use of irradiation control data according to claim 11, and on the other hand by a supervisory device according to claim 12, a control device according to claim 13, and an apparatus for additive manufacture according to claim 14.

In the method according to the invention for supervising an additive manufacturing process as described at the outset, a process chamber supervisory data set is generated on the basis of the irradiation control data by supervisory data being encoded process chamber point by process chamber point. On the basis of this process chamber supervisory data set or an analysis of this process chamber supervisory data set, quality data relating to at least the manufacturing process can then be determined, in particular quality data relating to the manufacturing product which has been produced or is still to be produced (also referred to as an "object" for short). This quality data may be constituted by different information containing or allowing for details regarding the quality.

For example, quality data can be generated by placing supervisory data in relation to parameters of which the effects on the process are known to a certain extent (for example also via value tables formed from previously determined correlations of supervisory data to measurement data regarding process and/or component part properties).

In particular, quality data can contain information regarding:

the likelihood of local deviations from an ideal energy input upwardly or downwardly, for example in the form of overheating or incomplete solidification, as an indicator for porosity, lack of strength, discolouration, contamination of the process atmosphere and therefore of the manufacturing products;

the likelihood of contaminations under consideration of the direction of flow at a process point or in regions of the process chamber, for example if the direction of irradiation corresponds substantially to the gas flow (the wind) instead of being directed substantially opposite the gas flow;

the likelihood of a visible or easily measurable quality of a manufacturing product, for example a smoothness, regularity and dimensional accuracy of surfaces;

the consistency of manufacturing parameters that are to be applied for identical parts, for example for the purpose of documenting an adherence to defined standards;

the likelihood of component part defects on account of an unfavourable data processing or on account of a fluctuating energy input.

Furthermore, in particular quality data of the following kind can be determined:

a precise specification of an anticipated construction time for one or more manufacturing products, which can be made possible for example by prior calculation of the overall irradiation process or projections based on a partial prior calculation;

image data of a manufacturing process in the form of a 2D or 3D model with irradiation lines for visualisation for a user or developer. Image data of this kind can be evaluated for example by means of external software, which for example can assess the quality of a scheduled irradiation process. This makes it possible to compare different irradiation parameters or parameter sets in the form of a simulation and therefore offers a possibility for improving the process without manufacturing actual component parts. In addition, the progress of a production process in real time can be made visible to a user on the basis of the image data.

The process chamber supervisory data set according to the invention thus contains, for the individual process chamber points, i.e. the spatial positions in the process chamber, a value which contains the supervisory data directly or in encrypted form, or a value tuple, for example a vector of supervisory data. In other words, the supervisory data are associated in the manner of a three-dimensional matrix with a process chamber dot matrix of the process chamber in which the manufacturing process is taking place with the solidification of the build-up material.

The supervisory data are obtained in accordance with the invention at least from the irradiation control data or are generated by a transformation of the irradiation control data. The irradiation data normally provided within the scope of the conventional control method for an additive manufacturing process are encoded in a time-based manner, i.e. they are present in the form of a process sequence (which can also be present in the form of time samples), on the basis of which it is clear at which position in the process chamber irradiation is occurring and what properties this irradiation has. The term "properties" can be understood here to mean, amongst other things, a power, a local speed, a focus position of a beam, or a beam profile, etc. The term "irradiation control data" can thus be understood accordingly to mean data regarding the energy introduced or to be introduced at a specific point and/or metadata (or irradiation metadata), containing information regarding the irradiation strategy, for example how often an irradiation is performed, what irradiation type is used, and in what order, etc. This will be detailed later with reference to exemplary embodiments. In the method according to the invention these irradiation control data are introduced into a multidimensional or three-dimensional matrix structure, from which application-specific information can be derived by a "view" of this structure, i.e. a type of filtering. By means of a method according to the invention for generating a "matrix-like" process chamber supervisory data set, encoded process chamber point by process chamber point, on the basis of the irradiation control data, a kind of reference data set or target data set can thus be generated, in which suitable information for supervising the manufacturing process or for further analysis and determination of the quality data is available for each process chamber point.

Besides the irradiation control data, further process control data can preferably additionally be encoded in the process chamber supervisory data set or can be encoded in the individual supervisory data, process chamber point by process chamber point. In this regard too, examples will be provided later.

By means of the use according to the invention of irradiation control data (which indeed are used per se to control the irradiation of the build-up material in the process chamber for selective solidification, preferably layer by layer or at least partially layer by layer, of the preferably powdery and/or viscous build-up material in the additive manufacturing process) to generate a process chamber supervisory data set for supervising the additive manufacturing process, a multiplicity of advantages can be achieved, as follows:

Since the irradiation control data and also further process control data are available already before the execution of a manufacturing process for a specific object, it is possible inter alia to generate such a process chamber supervisory data set at any moment before, during, or after a manufacturing process and to use it for a quality analysis. In particular, a prior supervision of a subsequent manufacturing process can thus already be carried out, in which it is checked what result can already be expected from the scheduled process strategy, in particular irradiation strategy, with regard to the quality of the manufacturing process or manufacturing product. To this end, a clear layer-by-layer model of the irradiation pattern, for example of the irradiation lines, can be provided to the user of the apparatus.

A further advantage of such offline supervision beforehand lies in the fact that—in contrast to the case of supervision in the above-described melt pool monitoring or optical tomography, in which an evaluation is made by the controller only during the process itself on the basis of the detected process emissions—it can be carried out already before the computing resources for the manufacturing process itself are required, or that it even can be outsourced to an independent, other computer with a high computing capacity.

Lastly, the process chamber supervisory data set in the described form can also be used, as will also be explained later, in order to carry out an irradiation- and location-specific evaluation of image-based monitoring systems, for example from sensor data obtained within the scope of a manufacturing process, for example in the described melt pool monitoring. In other words, the method according to the invention, as will be described later, can also be used advantageously in combination with melt pool monitoring or optical tomography.

The data could also be used to design a graphical user interface by means of which the user can immediately see the progress of the construction process and/or any problem points in a real-time reconciliation with the process monitoring (for example via the melt pool monitoring).

A supervisory device according to the invention for an apparatus for additive manufacture of manufacturing products, in particular three-dimensional manufacturing products, of the kind described in the introduction accordingly requires a supervisory data set determination device, which is designed, in the above-described way and on the basis of the irradiation control data, to determine a process chamber supervisory data set, in which the control data are encoded process chamber point by process chamber point.

This supervisory data set determination device either can receive the irradiation control data by means of a suitable interface (also in the form of an entirely software interface) and can then generate the supervisory data with use of the irradiation control data itself, or can receive an already finished process chamber supervisory data set via a suitable interface, provided the process chamber supervisory data set was generated previously on another computer from the irradiation control data. For example, suitable irradiation control data and an associated process chamber supervisory data set could be delivered to production devices belonging to other companies, for certain manufacturing processes. In this regard, the invention also relates to a control data set comprising irradiation control data for controlling an irradiation apparatus for an apparatus for the additive manufacture of manufacturing products and also a process chamber supervisory data set of the above-described kind, generated on the basis of this irradiation control data.

The supervisory device furthermore requires a quality data determination device which is designed to determine, as described and on the basis of the process chamber supervisory data set, quality data relating to the manufacturing process and in particular the manufacturing product to be manufactured or already manufactured.

The method according to the invention for supervising an additive manufacturing process can be used accordingly within a method according to the invention for controlling an additive manufacturing process by determining quality data relating to the particular manufacturing process or the manufacturing product already before and/or during and/or after a current manufacturing process with the supervisory method according to the invention, and on that basis then preferably modifying process control data, in particular irradiation control data, for the current and/or a subsequent manufacturing process. In this variant, the control method can also be used in particular to construct a kind of closed-loop control loop in which process control data, in particular irradiation control data, are modified such that optimal quality data are achieved.

A control apparatus according to the invention for an apparatus for the additive manufacture of manufacturing products requires, accordingly, a previously described supervisory device and preferably a modification unit, in order to—if necessary—modify the process control data, preferably irradiation control data, depending on the determined quality data.

An apparatus according to the invention for the additive manufacture of manufacturing products accordingly comprises a previously described control device. In addition, an apparatus of this kind for the additive manufacture of manufacturing products should also comprise all further components conventional for an apparatus of this kind, such as a process space or a process chamber, in which the build-up material can be introduced suitably, for example layer by layer, and a suitable irradiation device, in order to selectively solidify the build-up material in the process chamber, so as to thus produce the manufacturing product in the form of a solid object, in order to name just a few of the components.

The supervisory device according to the invention and the control device according to the invention can be provided wholly or partially in the form of software. This is true in particular for the supervisory device or the supervisory data set determination device and quality data determination device thereof, which can be provided in the form of suitable software program parts on a computer unit. This computer unit can in particular also be part of a computer unit, for example the control device. However, it is also possible in principle to provide the supervisory device on an external computer, which for example is coupled suitably to the control device for data exchange, such that the control device can access this supervisory device as an external part.

A largely software-based embodiment has the advantage that control devices and/or supervisory devices already used previously can be easily retrofitted by a software or firmware update, in order to work in the manner according to the invention. In this regard, the object is also achieved by a corresponding computer program product comprising a computer program which can be loaded directly into a memory device of a control device and/or supervisory device, with program portions for carrying out all of the steps of the method according to the invention when the program is run in the control device. A computer program product of this kind may also comprise, besides the computer program, additional constituents as necessary, for example a documentation and/or additional components, also hardware components, such as hardware keys (dongles, etc.), for use of the software. A computer-readable medium, for example a memory stick, a hard drive or another transportable or fixedly installed data carrier, on which the program portions of the computer program readable and executable by a computer unit of the control device and/or supervisory device are stored, can be used to transport the control device and/or for storage on or in the control device and/or supervisory device. The computer units for this purpose can comprise one or more cooperating microprocessors or the like, for example.

Further particularly advantageous embodiments and developments of the invention will become clear from the dependent claims and the following description, wherein the independent claims of each claim category can also be developed analogously to the dependent claims and exemplary embodiments of another claim category, and in particular individual features of various exemplary embodiments or variants can also be combined to form new exemplary embodiments or variants.

As mentioned above, quality data can be obtained in different ways with the aid of the process chamber supervisory data set.

In a preferred exemplary embodiment a process chamber sensor data set is detected and the quality data are determined on the basis of a combined analysis of the process chamber supervisory data set and the process chamber sensor data set, for example in that the process chamber supervisory data set or parts of the supervisory data, this being provided process chamber point by process chamber point, are compared with the process chamber sensor data set. In other words, the process chamber supervisory data set or a subordinate data set, which is also provided process chamber point by process chamber point, can be used as a "target data set" for comparison with a process chamber sensor data set forming the "current data set", detected for example within the scope of melt pool monitoring or optical tomography.

For example, in a powder-bed-based additive manufacturing process, as is described in the introduction, the component layers are solidified within the scope of a defined scanning or irradiation strategy by a predetermined sequence of individual "scan vectors" (irradiation paths), wherein a plurality of irradiation paths can also be irradiated simultaneously. The process emissions vary depending on the sequence and selected solidification parameters (which for example include the speed, irradiation intensity profile, irradiation power, etc.) for the individual scan vectors and depending on the solidified mass therebeneath and therebeside. If these process emissions, as described in the introduction, are recorded in a spatially resolved manner by optical sensors, a two-dimensional image of the process emissions can be generated for the individual layers. The spatially resolved measurement can also be performed here layer by layer, in each case directly by means of a suitable spatially resolving camera system or by means of another sensor assembly or a sensor by an association of the current processing position with the recorded signal. Images of different layers can be stacked to form a three-dimensional image data set of the process emissions. Both the two-dimensional layer images and the three-dimensional data set can be considered and/or used as a process chamber sensor data set.

This process chamber sensor data set contains, in a spatially resolved manner—that is to say likewise in a matrix-like manner in the same or a differently resolved process chamber dot matrix as compared to the process chamber supervisory data set—information correlated with an energy density and quantity actually introduced into the build-up material. The process chamber sensor data set, however, can also be correlated with various further criteria, for example at which location of the process chamber which material or which material mixture, or which particle size distribution is present, because all of these data have an influence on the emissions. The process chamber sensor data set can be measured directly by a suitable sensor assembly or a camera, as described previously within the scope of the supervisory method, or can also be adopted from a measurement taken for a different purpose.

The dimensions and/or the volume of a process chamber point can be selected freely—both for the process chamber supervisory data set and the process chamber sensor data set. For example, in the case of a layer-based, that is to say horizontal, area resolution of a process chamber supervisory data set or a process chamber sensor data set of 1 megapixel, i.e. a million pixels, the partial area of the construction field mapped in a process chamber point can be approximately one millionth of the total area of the construction field. The depth of a process chamber point can correspond for example to the thickness of an individual layer. A process chamber supervisory data set or a process chamber sensor data set can therefore comprise several thousand (for example 20,000) selectively solidified layers in the Z direction of a construction volume, i.e. in the vertical direction.

In the evaluation it is advantageous if the additional information, i.e. the irradiation control data and the associated metadata, can be used in the process chamber supervisory data set in order to obtain an improved evaluation. In particular, it is thus possible to selectively parameterise the image processing for the evaluation of the process emissions for extraction of possible anomalies and therefore to make said evaluation more sensitive to the provided energy input and/or the geometry of the particular object cross-section. Monitoring in the conventional method with the melt pool monitoring method or optical tomography is thus also made more sensitive and less susceptible to faults.

For example, in an apparatus for additive manufacture which comprises a plurality of energy beams for solidifying build-up material, a useful assertion regarding the precision of the calibration of the working beams in relation to one another, for example in boundary regions of their assigned working regions, or in relation to the construction field, can be derived by a suitable evaluation of process chamber supervisory data set and process chamber sensor data set.

In order to use the method according to the invention in combination with such a process chamber sensor data set, the apparatus for additive manufacture preferably comprises a suitable sensor assembly comprising one or more sensors, particularly preferably an area sensor, which is suitable for spatially resolved measurement of emissions, for example a camera sensor (a CCD or CMOS sensor or the like). The quality data determination device of the supervisory device according to the invention is then particularly preferably designed accordingly, so as to determine the quality data on the basis of a comparison of the process chamber supervisory data set with the process chamber sensor data set.

As will be explained later in greater detail with reference to a more specific example, location-dependent tolerance values, which in particular can be used for the comparison with the sensor process chamber data set, are determined on the basis of the process chamber supervisory data set. This enables an easier identification of critical points in the component part, in particular by tolerance values adapted to the particular situation of the location, such that an incorrect fault identification or also the overlooking of actual faults can be avoided. Alternatively or additionally, various image processing algorithms can be used in a location-adapted manner in order to identify critical points, for example in order to assess the geometry of a detected deviation in order to characterise this.

A target image can thus preferably be used, on the basis of the process chamber supervisory data set, as a mask for the selection of a region in a current image (the process chamber sensor data set) within which the irradiation occurred or will occur with specific features. For example, component part regions with allocated irradiation types can be marked in the current image. The use of the narrower tolerance bands thus possible, which have been determined depending on the meta information from the process chamber supervisory data set, improves the identification of faults and deviations.

The process chamber supervisory data set can contain a multiplicity of information for the individual process chamber points. It particularly preferably comprises one of the following items of information:

irradiation types applied or to be applied to the process chamber point. Here, an irradiation type can be defined at least by a specific scanning pattern by means of which the region to be solidified is to be scanned by the beam. In addition, the irradiation type may also specify a radiation energy density or a radiation energy density distribution of the beam, a beam diameter, an area or a shape of the beam cross-section and/or a speed of the beam.

Certain irradiation types are thus usually defined beforehand for certain regions of the manufacturing product or "object". One irradiation type impinges on the "contour" region, corresponding to an edge region of the object, i.e. this region lies on an outer or inner surface of the finished object. In addition, there is an "inskin" irradiation type, which is provided for an internal region corresponding to the total cross-sectional area minus the contour region. A further irradiation type is the "downskin" irradiation type. This is applied in a "downskin" area, which during production lies directly above remaining, unsolidified build-up material, whereas accordingly an "upskin" irradiation type is provided for an "upskin" region, which after the fastening and during the further production process is covered directly by unsolidified build-up material, which also is not solidified further.

In addition, there is a "support" irradiation type for the "support" regions, which form part of a support structure for the object to be produced and then have to be removed again from the manufacturing product. Since different requirements are placed on the different regions, for example in respect of the attained density, porosity, surface quality, dimensional accuracy and/or irradiation speed, such an assignment of specific irradiation types to the individual regions is expedient. Accordingly, it is also advantageous to consider this information suitably in the process chamber supervisory data set at the corresponding process chamber point.

temporal information, preferably a temporal order of the irradiation types applied or to be applied to the particular process chamber point. As will be shown later on the basis of an exemplary embodiment, it may be that irradiation with different irradiation strategies and/or irradiation types is performed at a certain process chamber point. This can be brought about in that a resolution of a representation of a layer through process chamber points has been selected in such a way that a plurality of irradiation events occurring at adjacent, that is to say non-identical, locations of the layer are detected collectively in merely one process chamber point. Alternatively, this phenomenon may therefore actually cause a plurality of irradiation events to occur nominally at the same point in a layer. In each of these cases it is advantageous to encode information in this regard also in the supervisory data of the supervisory data set.

the position of the process chamber point in relation to an overlap region, if work is performed using what is known as a multi-scanner system or a multi-beam system, in which beams of a plurality of or different radiation sources can overlap one another. Here, it is generally sufficient if, for a specific process chamber point, it is encoded in the supervisory data set whether this process chamber point is located inside or outside an overlap region.

information regarding the position of the process chamber point in relation to adjacent irradiation areas. Usually, irradiation is performed in a specific pattern, for example a chequerboard pattern, in the form of adjacent strips or areas, which likewise can overlap one another at least partially. These strips, areas or the like are referred to here as irradiation partial areas (in the case of scanner-based systems they can also be referred to as "scan regions"). Here, it is also usually sufficient if it is specified whether or not the process chamber point lies in such an overlap region or directly at a boundary to an adjacent irradiation partial area.

at least one, preferably physical parameter value, which represents at least one irradiation event occurring at this process chamber point, preferably an aggregation of such parameters. For example, an energy density input value can be directly encoded in the supervisory value. Such a parameter value can also be a zero value, i.e. a parameter value indicating that no irradiation event should occur.

an order number associated with the particular process chamber points or an object identification code associated with the particular process chamber point, for example a part identification number or the like. In many manufacturing processes, specifically, not only is one manufacturing product, but also a plurality of manufacturing products produced side by side and/or one above the other in three-dimensional space, similarly to the situation in which, in a printing method, a plurality of uses can be provided on one printing plate. In this case it is advantageous if, with the aid of the process chamber supervisory data set, each process chamber point can also be uniquely associated with a specific manufacturing product or object. In the event of an identification of a quality defect on the basis of the determined quality data, it can thus be determined straight away precisely which manufacturing product has been affected hereby, such that, in case of doubt, only this manufacturing product has to be separated out, whereas the other manufacturing products can be used soundly.

In addition, further information can be encoded in the process chamber supervisory data set, process chamber point by process chamber point, i.e. for the individual process chamber points. In a preferred exemplary embodiment the process chamber supervisory data set for example contains information regarding what is known as a partial overlap, which can occur if complicated manufacturing products are to be manufactured which comprise a number of individual manufacturing products which are connected to one another or transition into one another incorrectly at certain points. For example, preparation for a manufacturing process (construction job) can be defective if a support structure is produced for a component and has an overlap with the component.

When creating or encoding the control values of the process chamber supervisory data set, absolute time information, i.e. when exactly something happens at a certain process chamber point, can preferably be reduced to relative time information by way of the chronological sequence of events, for example the applied irradiation types, in the particular process chamber point.

Besides the above-mentioned irradiation control data and further data, one or more of the following process control data items can also be encoded in the process chamber supervisory data set, process chamber point by process chamber point:

Process gas flow control data: these data relate to parameters of the flow of process gas or inert gas within the process chamber, for example the speed and/or orientation of process gas flows, of the pulse of an injection or an extraction of process gas, etc. All of this data can be generated in relation to both a global and also an additional alternatively used local flow or extraction. In addition, these process gas flow control data can include information regarding the material composition of a used process gas, more specifically in particular at the location of the solidification, etc.

Coated control data: these data can include for example information regarding the speed of a coater in operation, the means used for coating, for example whether a blade or a brush is used, information regarding the orientation of a coating means relative to the powder bed, or regarding a fluidisation of a powder store in the coater, etc.

Heating control data: these data can include parameters such as a global and/or local heating of a construction field and/or of a powder store, a temperature distribution, for example relative to a heated area, and/or the duration of heating, or a selection or combination of different heating means, for example infrared heating, induction heating, microwave heating, laser heating, etc.

As mentioned above, the control data can be encoded in any way at the individual process chamber points, wherein it is possible, inter alia, to associate each image point with a value tuple or vector of individual supervisory data. There is preferably only a single value for each process chamber point.

In a particularly preferred variant the process chamber supervisory data set is encoded in an image format in which process chamber points are each associated with an image point, that is to say in the form of a pixel (considered two-dimensionally) or voxel (considered three-dimensionally), with a supervisory value. Here, in each process chamber point, the irradiation events that have occurred there, for example in accordance with a temporal sequence, can be encoded in bits, as will be explained later in greater detail. It is then advantageously sufficient to use just one supervisory value for each process chamber point, which for example comprises 8, 16, 24, 32, . . . etc. bits in accordance with conventional image coding.

This formatting can then be interpreted for example as a 1-channel image format, that is to say as a greyscale image. As will also be explained later, it is also possible, however, to interpret the same data set as a coloured image with various colour channels, wherein each colour channel is associated with a certain bit region within the supervisory value, for example three colour channels each with 8 bits in a 24-bit supervisory value, wherein one colour channel corresponds to a red image, one colour channel corresponds to a green image, and a third colour channel corresponds to a blue image (RGB coding).

Here, the supervisory values of the image format particularly preferably can be encoded bit-wise, such that physical parameters, that is to say for example introduced energy densities or quantities, are encoded in higher-value bits than for example other values, such as order numbers or the like, so as to be able to perceive these physical parameters directly with the naked eye in a presentation of the bytes converted into an image. It can also be ensured that for example irradiation types that are correlated with higher energy inputs are encoded in higher-value bits than irradiation types with relatively lower energy inputs, that is to say for example "inskin" higher-valued than "contour", or purposely vice versa. It is also possible to encode order numbers or the object identification code into the higher-value bits such that the individual objects or manufacturing products are immediately identifiable in the image. The optimal coding may be dependent on how much later the evaluation of the process chamber supervisory data set will be performed and/or presented to a user.

Since preferably a combined analysis of the process chamber supervisory data set with a process chamber sensor data set is to be performed, the process chamber supervisory data set is preferably formed (i.e. the process chamber dot matrix is selected) such that it has a spatial resolution corresponding at least to the spatial resolution of the process chamber sensor data set. The spatial resolution of the process chamber supervisory data set is preferably adapted to the spatial resolution of the process chamber sensor data set, i.e. for example to a native spatial resolution of the used sensor, for example by means of a distortion or rectification. Such an adaptation can be performed by creating the process chamber supervisory data sets immediately in accordance with the spatial resolution of the process chamber sensor data set, when the spatial resolution thereof is known. However, a subsequent scaling is also possible in principle, i.e. the spatial resolution of the process chamber supervisory data set and/or of the process chamber sensor data set can be reduced accordingly by down-scaling or can be increased by interpolation. Here, it is preferred to create the process chamber sensor data set with the highest possible spatial resolution allowed by the used sensor and to create the process chamber supervisory data set such that it corresponds either immediately to this spatial resolution or has a higher spatial resolution, such that it is possible to dispense with an interpolation, and instead a down-scaling is performed better. Process chamber supervisory data sets produced once can then be re-used, for example if a sensor assembly with a higher native spatial resolution is used later in the apparatus.

As already mentioned multiple times, the process chamber supervisory data set can be created at any moment in time. It is generated particularly preferably before or after the execution of a manufacturing process that is to be supervised by means of the process chamber supervisory data set, so as not to use any computer capacity during the manufacturing process and so as to avoid any delays to the manufacturing process caused by the creation of the process chamber supervisory data set.

A particular advantage of the generation of the process chamber supervisory data set prior to the execution of the manufacturing process that is to be supervised lies in the fact that irradiation paths and patterns can be visualised already beforehand, in order to show any problem points and in order to allow the user to intervene correctively already before the manufacturing process is started. For example, a geometric comparison of component geometry data and irradiation paths or supervisory data can also be performed outside the machine, for example by computer program. Measures for improving an irradiation strategy can be developed on the basis of such a comparison.

The generation of a process chamber supervisory data set has the advantage that the total duration of preparation and execution of a manufacturing process can be reduced if a suitable computing power is available. In addition, it is possible to respond in a more versatile manner to any new changes in the irradiation strategy. An example of this would be if—as described above—the process chamber supervisory data set and the quality data derived therefrom are used in a type of closed-loop control, i.e. irradiation control data are altered online on the basis of the supervision.

In order to also use minimal computing capacity during the manufacturing process in such cases, a modification of the process chamber supervisory data set can also be performed during the manufacturing process, particularly preferably in the case of generation of the supervisory data set prior to execution of the manufacturing process, i.e. the primary effort for creating the process chamber supervisory data set can occur already before the start of a manufacturing process, and necessary modifications in the process chamber supervisory data set are only then made subsequently, that is to say for example new supervisory data are determined only at the process chamber points at which this is necessary.

A modification and thus a process improvement during a running process is also conceivable, in the sense that a plurality of parts, for example the first pieces, of a batch are used as test parts, which later can be separated out as appropriate if certain quality requirements are not met.

BRIEF DESCRIPTION OF THE DRAWINGS

The invention will be explained once again in greater detail hereinafter with reference to the accompanying figures provided with reference to exemplary embodiments. Here, like components are provided with identical reference signs in the various figures, in which:

FIG. 6 shows a schematic depiction of a number of process chamber points of a process chamber dot matrix with two process chamber points through which irradiation paths having different irradiation types run, FIG. 7 shows a first example of a possible bit-wise encoding of the irradiation types for the two process chamber points in FIG. 6, FIG. 8 shows a second example of a possible bit-wise encoding of the irradiation types for the two process chamber points in FIG. 6.

DETAILED DESCRIPTION OF THE EMBODIMENTS

The following exemplary embodiments are described with reference to an apparatus 1 for the additive manufacture of manufacturing products in the form of a laser sintering or laser melting apparatus 1, wherein it is explicitly again noted here that the invention is not limited to laser sintering or laser melting apparatuses. The apparatus therefore will be referred to hereinafter—without loss of generality—as a "laser sintering apparatus" 1 for short.

Figure 1:
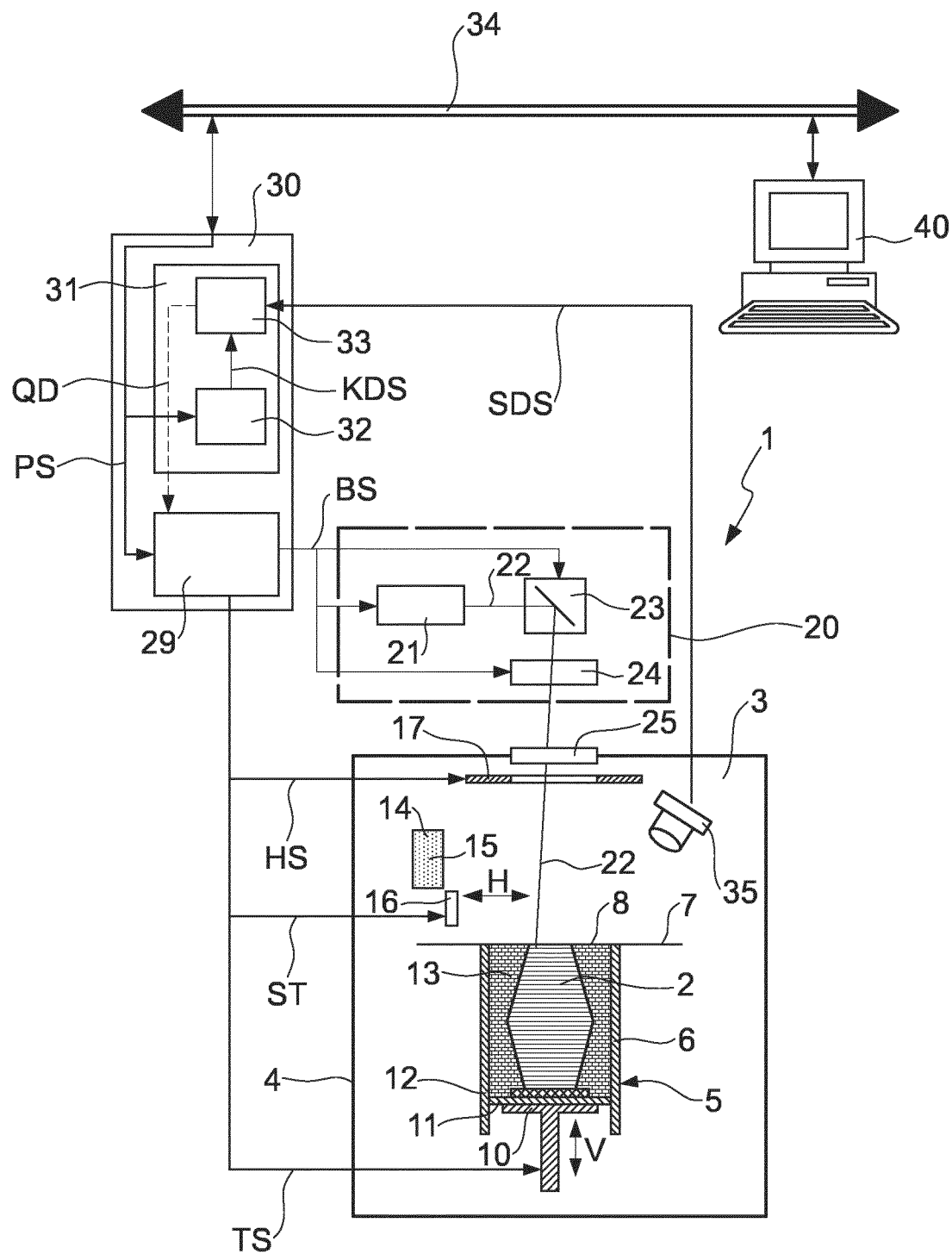
FIG. 1 shows a schematic, partly sectional view of an exemplary embodiment of an apparatus for the additive manufacture of manufacturing products.

A laser sintering apparatus 1 of this kind is shown schematically in FIG. 1. The apparatus comprises a process space 3 or a process chamber 3 with a chamber wall 4, in which the manufacturing process is performed substantially. An upwardly open container 5 with a container wall 6 is situated in the process chamber 3. The upper opening of the container 5 forms the current working plane 7. The region of this working plane 7 lying within the opening of the container can be used to build up the object 2 and is therefore referred to as a construction field 8. It is generally sufficient if the process chamber supervisory data KDS and process chamber sensor data SDS used within the scope of the invention relate to the region of the process chamber, or as appropriate also part thereof, defined by the construction field 8 (i.e. in each working plane).

The container 5 has a base panel 11 movable in a vertical direction V and arranged on a support 10. This base panel 11 closes the container 5 downwardly and thus forms the bottom of the container. The base panel 11 can be formed integrally with the support, but can also be a panel formed separately from the support 10 and can be fastened to or easily mounted on the support 10. Depending on the specific build-up material, that is to say for example the used powder, and depending on the manufacturing process, a construction platform 10 can be mounted on the base panel 11 as a construction substrate, on which the object 2 is built up. In principle, however, the object can also be built up on the base panel 11 itself, which then forms the construction substrate.

The fundamental building of the object 2 is performed by firstly applying a layer of build-up material to the construction platform, then—as will be explained later—selectively solidifying the build-up material by means of a laser at those points which are intended to form parts of the object to be manufactured, then lowering the base panel 11, and thus the construction platform, with the aid of the support 10 and applying a new layer of the construction material and then selectively solidifying same, etc. In FIG. 1 the object 2 built up in the container on the construction platform 12 is shown below the working plane in an intermediate state. It already has a plurality of solidified layers, surrounded by remaining, unsolidified build-up material 13. Various materials can be used as build-up material, preferably powder, in particular metal powder, plastic powder, ceramic powder, sand, filled or mixed powder, or also pasty materials.

Fresh build-up material 15 is disposed in a storage container 14 of the laser sintering apparatus 1. The build-up material can be applied in the working plane 7 or within the construction field 8 in the form of a thin layer with the aid of a coater 16 movable in the horizontal direction H.

An additional radiation heater 17 is optionally disposed in the process chamber 3. This heater can be used to heat the applied build-up material 13, such that the irradiation device used for the selective solidification does not have to introduce too much energy. This means that a certain amount of basic energy can already be introduced into the build-up material, for example with the aid of the radiation heater, although this basic energy is of course still below the necessary energy level, at which the build-up material melts or even sinters. For example, an infrared emitter can be used as radiation heater 17.

For selective solidification, the laser sintering apparatus 1 comprises an irradiation apparatus 20 or specifically an exposure apparatus 20 with a laser 21. This laser 21 generates a laser beam 22, which is deflected via a deflection apparatus 23 so as to thus travel over the exposure paths or tracks provided in accordance with the exposure strategy in the layer that is to be solidified selectively and so as to selectively introduce the energy. This laser beam 22 is also focused suitably by a focusing device 24 in the working plane 7. The irradiation apparatus 20 is preferably disposed here outside the process chamber 3, and the laser beam 22 is conducted into the process chamber 3 via an in-coupling window 25 mounted on the upper side of the process chamber 3 in the chamber wall 4.

The irradiation apparatus 20 for example can comprise not only one laser, but a plurality of lasers. This laser may preferably be a gas or solid-state laser or any other type of laser, for example can be formed by laser diodes, in particular a VCSEL (vertical cavity surface emitting laser) or VECSEL (vertical external cavity surface emitting laser) or a row of these lasers.

The laser sintering apparatus 1 furthermore contains a sensor assembly 35, which is suitable for detecting process radiation emitted as the laser beam 22 impinges on the build-up material in the working plane. This sensor assembly 35 operates here in a spatially resolved manner, i.e. it is capable of detecting a kind of emission image of the layer in question. An image sensor or a camera which is sufficiently sensitive in the region of the emitted radiation is preferably used as sensor assembly 35. Alternatively or additionally, one or more sensors could also be used in order to detect an optical and/or thermal process radiation, for example photodiodes, which detect the electromagnetic radiation emitted by a melt pool under impinging laser beam 22, or temperature sensors for detecting an emitted thermal radiation. It is possible to associate the signal of a sensor, which itself does not provide spatial resolution, with the coordinates by temporal association between the coordinates used for the actuation of the laser beam and the sensor signal. In FIG. 1 the sensor assembly 35 is arranged within the process chamber 3. However, it could also be situated outside the process chamber 3, and could then detect the process radiation through a further window in the process chamber 3.

The signals detected by the sensor assembly 35 are transferred here as process chamber sensor data set SDS to a control device 30 of the laser sintering apparatus 1, which is also used to actuate the various components of the laser sintering apparatus 1 for overall control of the additive manufacturing process.

To this end, the control device 30 comprises a control unit 29, which usually actuates the components of the irradiation apparatus 20, specifically here the laser 21, the deflection apparatus 23 and the focusing apparatus 24, and to this end transfers irradiation control data BS thereto accordingly.

The control unit 29 also controls the radiation heater 17 by means of suitable heater control data HS, the coater 16 by means of coating control data ST, and the movement of the support 10 by means of support control data TS.

In addition, the control device 30 here comprises a supervisory device 31, which on the one hand comprises a supervisory data set determination device 32, which—as will be described hereinafter—generates a process chamber supervisory data set KDS at least on the basis of the irradiation control data BS, optionally also with use of further process control data PS, such as the heating control data HS, the coating control data ST or the support control data TS. This process chamber supervisory data set KDS is transferred here to a quality data determination device 33 of the supervisory device 31, which, as shown in FIG. 1, additionally receives the process chamber sensor data set SDS and on this basis determines quality data QD, which for example can also be transferred in a variant back to the control unit 29 so as to be able to intervene in the additive manufacturing process in a manner using closed-loop control.

The control device 30 is coupled here for example via a bus 34 or another data connection to a terminal 40 having a display or the like. The user can control the control device and therefore the entire laser sintering apparatus 1 via this terminal. In particular, the process chamber sensor data set STS and/or the process chamber supervisory data set KDS and/or the determined quality data QD can be suitably visualised on the display of the terminal 40, as will be explained later with reference to the examples.

It should be noted once again at this juncture that the present invention is not limited to such a laser sintering apparatus 1. It can be applied to any other method for the generative or additive production of a three-dimensional object by application, in particular layer by layer, and selective solidification of a build-up material, wherein, for the purpose of solidification, an energy beam is delivered to the build-up material that is to be solidified. Accordingly, the irradiation apparatus can not only be a laser, as described here, but instead any device with which energy can be brought selectively onto or into the build-up material in the form of wave or particle radiation could be used. For example, another light source, an electron beam, etc., could be used instead of a laser.

Although only an individual object 2 is shown in FIG. 1, it is possible and generally also conventional to produce a plurality of objects in parallel in the process chamber 3 or in the container 5. An example of this will also be provided later. To this end, the build-up material is scanned layer by layer by the energy beam at points corresponding to the cross-sections of the objects in the various layers.

Figure 2:
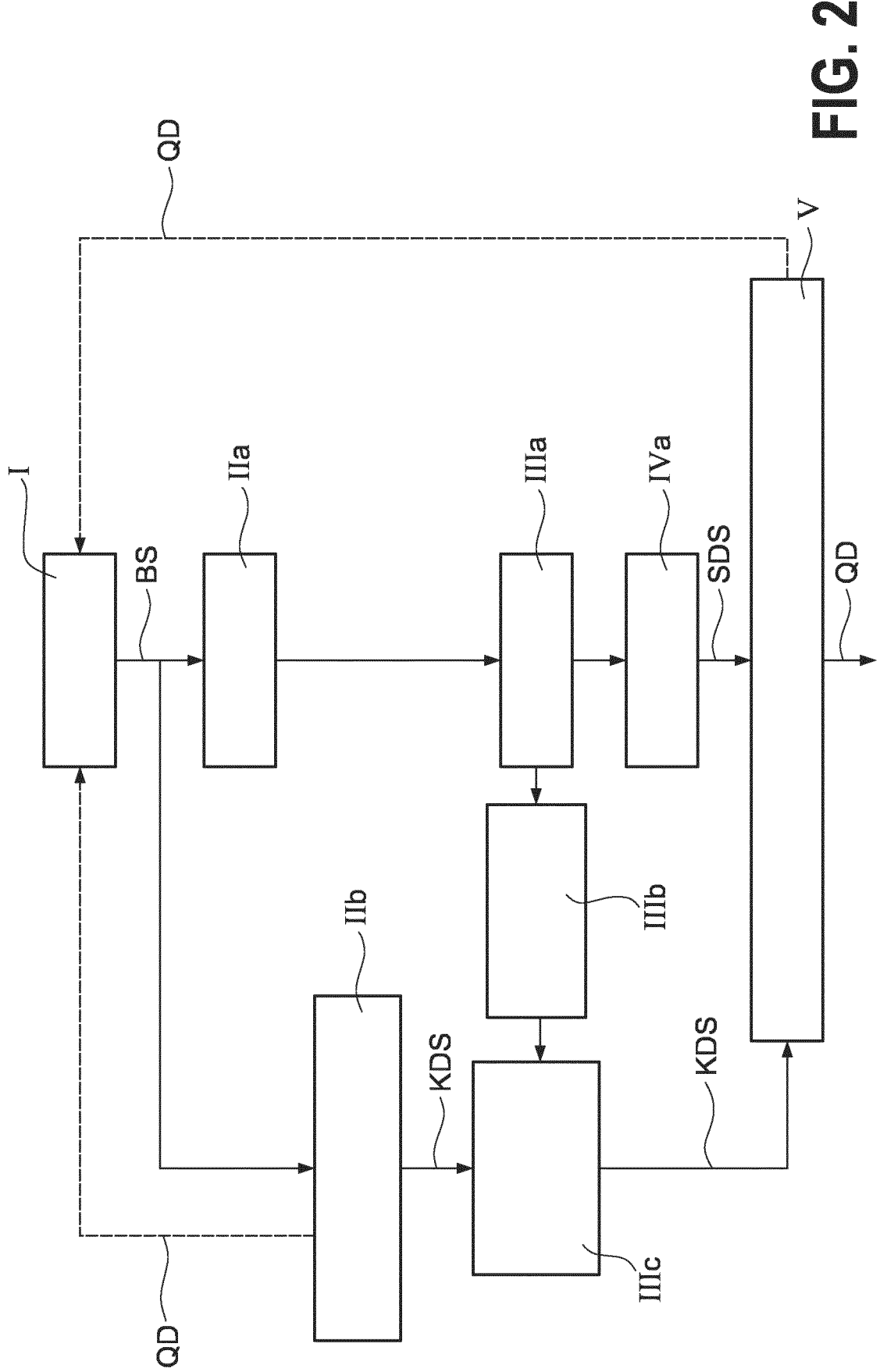
FIG. 2 shows a flow diagram of a first example of a possible sequence of the method according to the invention.

FIG. 2 shows a heavily simplified flow diagram for a method according to the invention. In step I the process control data PS are firstly defined as a whole, that is to say an exposure strategy is worked out for example on the basis of the 3D construction data, and corresponding process control data PS, in particular exposure control data BS, but also control data for a heater, the coater, for a flow through the process chamber, for the support control, etc., are defined. This can occur at any moment in time prior to execution of an additive manufacturing process. The process control data PS can be transmitted for example also via the bus 34 to the control device 30, in particular the control unit 29 and the supervisory data set determination device 32 (see FIG. 1).

During a manufacturing process, the irradiation control data BS are then transferred to the irradiation device 20, wherein the irradiation control data BS are transferred in the form of a sequential data stream with vectors. The laser beam 22, on the basis of this sequential data stream, then travels along an irradiation path in accordance with a predefined irradiation pattern, which for example can be a striped pattern or a chequerboard pattern, etc., to the current layer in which the build-up material 13 is to be selectively solidified (step IIa).

Consequently, process emissions are created in the current layer at the selectively irradiated points, as has already been described above, and are detected in step IIIa by means of a suitable sensor apparatus 35, here the camera 35. Steps IIa and IIIa are therefore performed substantially practically in parallel and progressively if build-up material is to be solidified in a manufacturing process.

In step IVa, the data of the sensor apparatus 35 are read out here and, provided they are not already present in the form of image data of the camera, i.e. in the form of two-dimensional images, are combined, possibly under consideration of the current coordinates of the laser beam, to form 2D images of the individual layers. Furthermore, a plurality of 2D images of different layers can also be collated to form a three-dimensional volume image data set. A 2D image of an individual layer can in turn be composed of a plurality of images, for example continuously recorded images, for example recorded over a period of solidification of the layer. This means that multiple images can be detected whilst the layer is selectively solidified, and the images are then combined in a suitable form. For example, maximum values for the individual image points can be determined, or the images can be superimposed or a mean value can be formed for all or individual image points. Within the scope of a pre-evaluation of each image, it may be that only the relevant regions are selected and taken into consideration in the combination. The 2D images and/or the volume image data set form process chamber sensor data sets SDS.

In addition, the sequential data stream is converted with the irradiation control data BS in step IIb, as mentioned, into a process chamber supervisory data set KDS. This step IIb can be performed at any time after step I, i.e. a short or also longer time before step IIa, parallel to steps IIa and IIIa, i.e. during the manufacturing process, but also only later following the completion of the manufacturing process.

A first evaluation of the process control data, in particular of the exposure control data BS, can then be performed on the basis of the process chamber supervisory data set KDS created in step IIb, and any necessary corrections to this data can be made, this being illustrated schematically by the dashed arrow from step IIb to step I, by already delivering first quality data QD back to the process controller. This step, however, is optional.

The process chamber supervisory data set KDS determined in step IIb is preferably compared with the sensor chamber data set SDS created in step IVa. Both the process chamber supervisory data set KDS and the process chamber sensor data set SDS are present in the form of supervisory data and sensor data respectively for the individual process chamber points in a fixed process chamber dot matrix. Here, the process chamber supervisory data set KDS is usually provided already in the form of a three-dimensional image, which can also be divided into two-dimensional layers.

For comparison, it is expedient to adapt the process chamber dot matrices of these two data sets KDS, SDS to one another, i.e. to ensure that the spatial resolution, i.e. the rasterisation, is identical and also the fields of view correspond to one another. An adaptation of this kind of the process chamber supervisory data set KDS to the process chamber sensor data set SDS is performed here in step IIIc. To this end, the sensor chamber, i.e. the field of view detected by the camera or sensor assembly, the resolution of the sensor, etc., are characterised in step IIIb. This characterisation in accordance with step IIIb can of course also be performed just once at the start, if a sensor assembly is being used for the first time. In other words, the necessary data can also be taken from a database of the apparatus, in which the essential data of the sensor assembly are stored. In step IIb the process chamber supervisory data set is preferably created such that it comprises the greatest possible field of view and the resolution is at least as high as the resolution that the sensor assembly 35, i.e. the camera 35, can offer as a maximum. In this case only a downscaling is necessary in step IIIc.

In step V the process chamber supervisory data set KDS and the process chamber sensor data set SDS are combined, and a region-specific parameterisation is performed, and as appropriate also a current/target comparison, in order to determine the quality data QD. These quality data QD for example can be information detailing whether or not, at a specific location, the values measured by the sensor assembly 35 lie within a predefined tolerance range. Examples of this will be provided later.

The quality data QD can then be output to the user, for example on a display of the terminal 40 (see FIG. 1) in the form of an image of the current layer or also in the form of a 3D reproduction of the constructed manufacturing products. The quality data QD can also be used to modify process control data during an additive manufacturing process and/ or for a subsequent manufacturing process, in order to improve the quality of the manufacturing process or a component part locally, i.e. in a partial region of an object cross-section that is to be solidified, or globally, i.e. based on one layer or a plurality of layers. This return of the quality data QD is symbolised by the dashed arrow from step V to step I.

Figure 3:
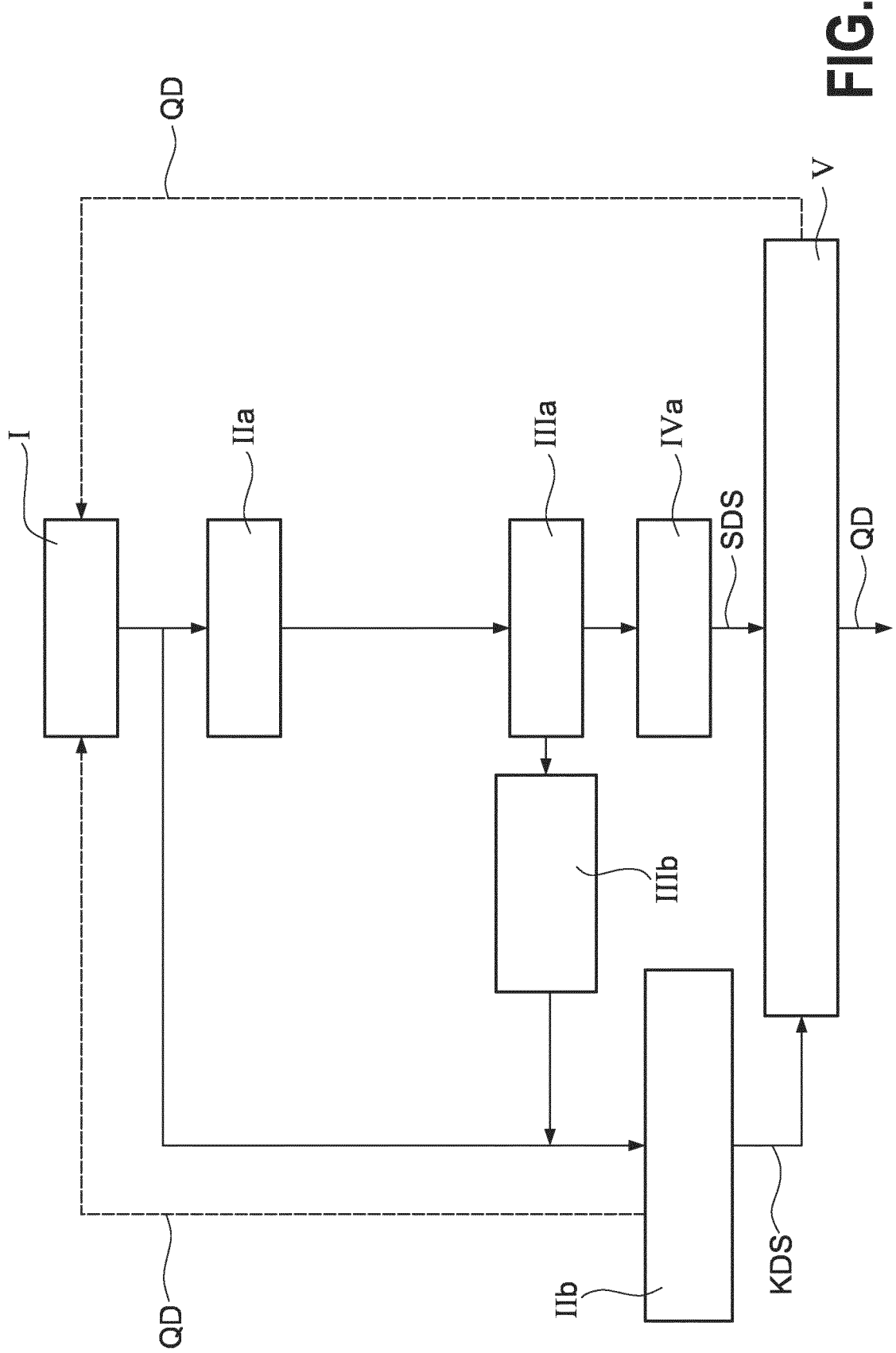
FIG. 3 shows a flow diagram of a second example of a possible sequence of the method according to the invention.

FIG. 3 shows a slightly modified variant of the method. In contrast to FIG. 2, the process chamber supervisory data set KDS is created here immediately in step IIb, such that it correlates already with the format of the process chamber sensor data set SDS recorded by means of the sensor assembly 35 in step IIIa and combined in step IV, such that in step V the desired analysis can be performed by a comparison of the required data. To this end, it is necessary, however, for the characteristic data of the sensor chamber, such as the field of view, the resolution, etc., to have been determined in step IIIb, prior to the step IIb. If step IIIb is possible only during the manufacturing process, i.e. during the recording of the process emissions by the sensor apparatus, step IIb in which the process chamber supervisory data set KDS is created could accordingly also only be performed during a running manufacturing process or thereafter. If the necessary data for characterisation of the sensor chamber are already known in advance, step IIb can of course also be performed prior to steps IIa, IIIa and IV. In addition, the method presented in FIG. 3 can proceed analogously to the method shown in FIG. 2.

The previously described "process closed-loop control", i.e. in particular the return of the quality data QD for modification of process control data during a running manufacturing process, can be performed in principle on different timescales. For example, a cycle can relate to an entire construction application, i.e. the entire manufacturing process. However, a cycle can also relate to an individual layer, i.e. a complete layer is always manufactured, measured and evaluated, and quality data QD are sent back. It is also possible to determine and report back quality data QD for individual exposure event groups, i.e. in each case in accordance with specific exposure paths, or parts of an exposure pattern or also even smaller time intervals. In principle, the closed-loop control process can of course also proceed continuously; however, in practice discrete intervals are often more expedient.

A possibility of how (for example in step V of FIGS. 2 and 3) quality data QD can be determined in a combined analysis of the process chamber sensor data set SDS with the process chamber supervisory data set KDS created in accordance with the invention will now be explained again with reference to the schematic diagram in FIG. 4. This is shown here on the basis of the example of a single layer. The schematically shown layer image SB of this layer is intended to represent the corresponding layer of the sensor data set SDS, i.e. a sensor value or measurement value M as was detected accordingly in a spatially resolved manner by means of the sensor assembly 35 is located at each pixel of this layer image. Information regarding the exposure control data, here specifically the exposure strategy for various spatial regions, has been transferred from the process chamber supervisory data set KDS, which has the same spatial resolution or rasterisation 8, in the form of a kind of "mask".

Figure 4:
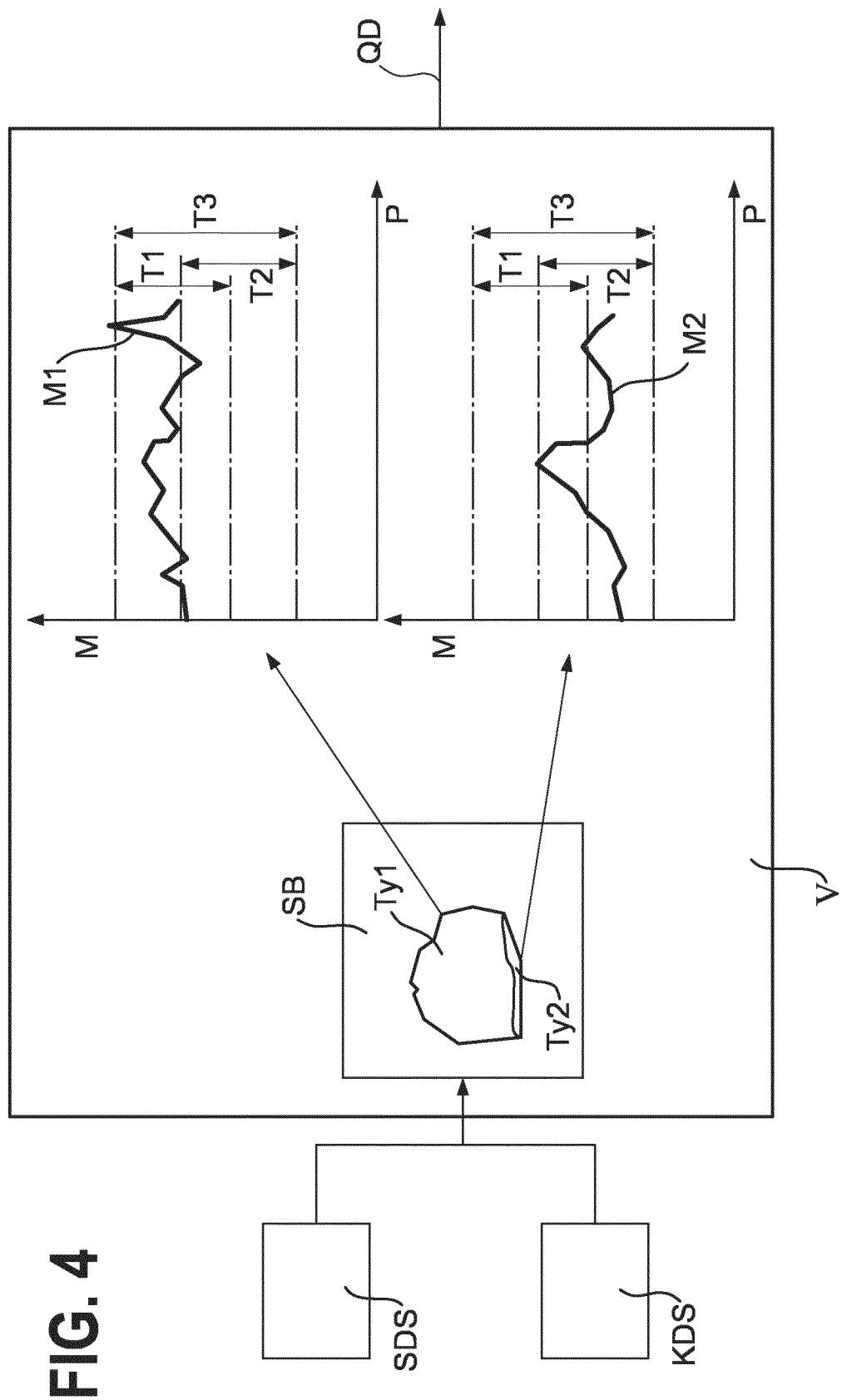
FIG. 4 shows a schematic depiction of the principal procedure in an exemplary embodiment of the method according to the invention.

In the example of FIG. 4, two spatial regions Ty1 and Ty2 are shown, in which irradiation is to be performed by means of different irradiation types. For example, the irradiation type "inskin" can be provided within the larger spatial region Yt1, since this is a region within the manufacturing product. The smaller spatial region Ty2 can be a surface of the manufacturing product pointing downwardly, i.e. for example in a direction at right angles to the working plane 7, and directly adjacent to unsolidified material. An irradiation with the irradiation type "downskin" is to be performed in this spatial region Ty2.

Since in this region the material is solidified by different irradiation types or irradiation strategies, different measurement values M are also measured accordingly at the individual positions or pixels in this region. For example, the measurement value M in question can simply be the measured radiation intensity of the emissions. It is usual that more irradiation energy is introduced in regions in which the material is to be solidified to a greater extent, and the emission values are higher accordingly than in the region in which a smooth surface structure which is as dimensionally stable as possible is to be created.

This can now be taken into consideration, when determining the quality data QD, since different tolerance ranges T1, T2, within which the measurement signal M1 from the first spatial region Ty1 and the measurement signal M2 from the second spatial region Ty2 may fluctuate, are also specified for the individual spatial regions Ty1, Ty2. In order to explain this, two curves are shown on the right-hand side in FIG. 4: M1 for the measurement values of the first spatial region Ty1, M2 for the measurement values of the second spatial region Ty2, wherein these measurement values M1, M2 are each plotted over a position P (shown here in each case merely schematically and therefore selected randomly). For example, the position can be the position along a strip through the region in question. In practice, measurement values M1, M2 for a layer are usually plotted two-dimensionally over a plane in accordance with the layer coordinates. The scaling of the measurement values M on the ordinates is likewise selected randomly, since merely the fundamental principle is being discussed here. In both curves the tolerance ranges T1, T2 partially overlapping one another for the respective irradiation types are shown. It can be clearly seen on this basis that it is now possible on account of the use of the process chamber supervisory data set according to the invention to adapt the tolerance ranges T1, T2 more specifically to the corresponding spatial region Ty1, Ty2 and the exposure strategy present there, and therefore to select them more narrowly, as a tolerance range T3 comprising both tolerance ranges T1, T2. The specific selection of the tolerance ranges T1, T2 possible as result of the invention can lead ultimately to a higher component part quality, since qualitative fluctuations can be discovered more easily, but nevertheless the risk of incorrectly shown quality fluctuations is reduced. The quality data QD determined on the basis of this evaluation can in principle easily be of a value such as "−1" for each individual process chamber point (i.e. pixel in a layer) if the measurement value lies beneath the tolerance range, "0" if the measurement value lies within the tolerance range, and "1" if the measurement value is too high. Besides the aforementioned "inskin" and "downskin" regions, other irradiation types can of course also be marked accordingly.

As already mentioned, the encoding of the irradiation control data in the supervisory data of the process chamber supervisory data set can be performed in different ways. For example, the irradiation type, a component part identification, the time of irradiation, certain irradiation events or sequences of irradiation events can be encoded in the supervisory data per process chamber point or pixel of a layer image or voxel of a three-dimensional volume, wherein for example nominal values of the actuation commands for the irradiation apparatus can also be adopted in principle and recoded in the relevant code. An aggregation of the continuous irradiation events within a discrete spatial process chamber point in accordance with the encoding is also possible, based on certain computing operations. For example, irradiation types of different irradiation paths which coincide spatially in the particular process chamber point, i.e. in the particular pixel or voxel, can thus be used suitably. The total energy input which is to be generated by the irradiation in question (i.e. the target total energy input) or also other physical variables, such as emission values anticipated directly from this process chamber point, provided there has been a conversion into such emission values, can also be encoded in the supervisory data, and such total energy inputs or the other physical variables can also be integrated.

It is then preferred if only one value is generated for each process chamber point, as in an image. For example, a conventional 1-channel greyscale image can be produced by encoding the information in the form of 16-bit grey values. For example, to this end, the five different irradiation types, such as "inskin", "upskin", "downskin", "contour" and "support" could be encoded in the lowermost 5 bits. As appropriate, a sixth bit can also be added, for example in order to also take into consideration a special irradiation type "edges" for filigree structures, which are not additionally exposed by the irradiation type "inskin". With a further bit, for example the sixth-lowest bit, it is possible to encode whether the pixel or the corresponding position in the construction area is formed by two mutually adjacent irradiation areas, for example a position in an edge region of a strip or overlap region of adjacent strips. This bit is for example easily set to the value 1 if the position of the relevant process chamber point is situated in such an edge region. With a further bit, for example the seventh bit, it can be encoded whether a multi-jet system is formed by a position in the overlap region of defined irradiation fields of two or more emitters, for example different lasers. Furthermore, the order in which the aforementioned irradiation types were applied could be encoded in the other bits, for example bits 8 to 14. If five irradiation types are now considered, there are thus for the sequence 5!=120 possibilities. These can be encoded in 7 bits.

In order to treat the information as a conventional image with 8, 16, 24, 32, etc. bits, the bit depth can be defined for example at 16 bits in the present case. One reserve bit or two reserve bits might then also remain, in which any further information or process control data can be encoded. A 16-bit encoding of this kind would be a typical grey image 1-channel encoding, which would be sufficient for many cases.

With the approach of an encoding in the form of individual image values, the information is partly reduced. For example, there is no longer any absolute time information, i.e. the exact time at which a certain irradiation type is irradiated at a certain process chamber point is not recorded, but instead only information regarding the temporal sequence of the applied irradiation types in the process chamber point in question. In particular in a layer-based monitoring approach in which an image is produced per layer, however, this time information is only of subordinate relevance anyway. For the evaluation it is usually more important to know the points at which there is an overlap of irradiations and/or the points exposed to repeated irradiation.

If more bits are available, other encodings are also suitable. As already mentioned, it is also advantageous if an object identification number or manufacturing product identification number or the like is also encoded in the process chamber supervisory data set in order to be able to immediately determine, in the event that a fault is discovered, which manufacturing product of a plurality of manufacturing products produced in parallel in a common manufacturing process is affected by this fault.

An example of a possible encoding with an object identification number PID will be explained hereinafter with reference to FIG. 5. Here, the supervisory data KD are encoded in the form of a 24-bit supervisory value KW, which could be divided into three channels, each with 8 bits. For example, this supervisory value could also be displayed in the form of an RGB image, wherein the uppermost 8 bits (the 8 bits on the left in FIG. 5) are output as blue component or blue image, the middle channel is output as green image, and the lowermost 8 bits (on the right in FIG. 5) are output as red channel or red image. In principle, however, a 24-bit supervisory value of this kind can also be output in the form of a greyscale image, although this is ultimately dependent merely on the interpretation of the output device. The information does not differ.

Figure 5:
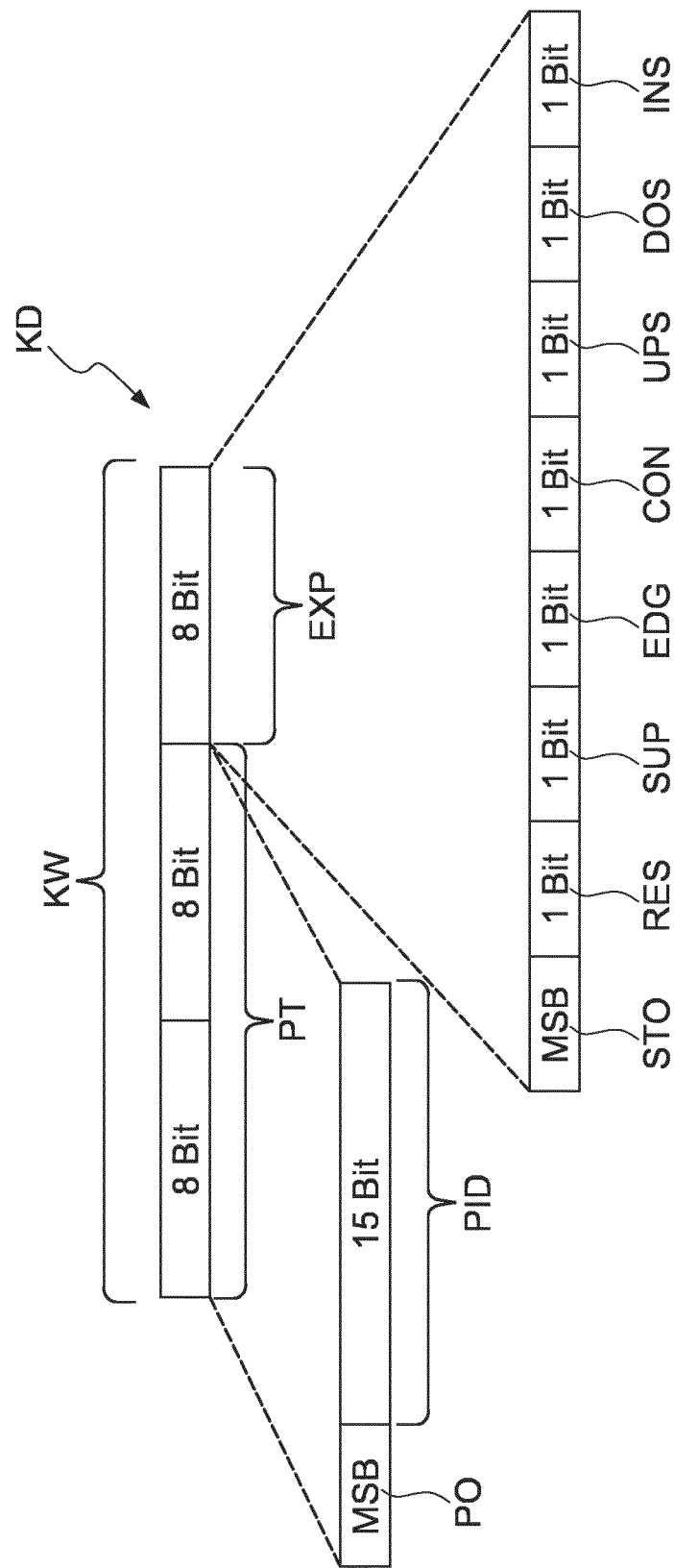
FIG. 5 shows a first example of a possible bit-wise encoding of supervisory data in a process chamber supervisory data set according to the invention.

In the exemplary embodiment shown in FIG. 5, the first 16 bits contain the information PT regarding the manufacturing product. The lowermost 15 bits of these uppermost 16 bits are used to encode the object identification number PID. The highest-value bit (MSP; most significant bit) is used as a "flag" or labelling or marking for part overlap information PO, specifying whether a number of parts occur at this position. This occurs in some cases when two parts are linked to one another at a specific point, that is to say for example in the case of two partial manufacturing products of a common total manufacturing product. In this case the highest-value bit MSB, which contains the part overlap information PO, is set to 1 (instead of 0, when there is no overlap at this position) and only the last object identification number PID is stored in the following 15 bits (i.e. the object identification number PID is overwritten).

The lowermost 8 bits of the supervisory value KW are used to store the irradiation information. Here, the first (lowermost) 6 bits EXP, as flags, specify the performed irradiation types inskin INS, downskin DOS, upskin UPS, contour CON, edges EDG and support SUP. If this position, i.e. the particular process chamber point for which the characteristic value KW is encoded, was exposed repeatedly with different irradiation types, a number of these bits can also be set simultaneously. The highest-value bit MSB of these lower 8 bits, which contain the exposure information EXP, is set if there was an overlap of "inskin" strips at the relevant process chamber point, that is to say it is used as strip overlap information STO. A further bit, the second-highest bit, is used here as a reserve RES in order to signal for example simulation data or a further exposure parameter or control data of the coater or the flow of process gas within the process chamber.

An example of this encoding of the irradiation information EXP will be provided once more with reference to FIGS. 6 and 7. FIG. 6 shows schematically the irradiation of two specific process chamber points PPi, PPj in a grid of process chamber points PP, wherein the irradiation is performed here in accordance with a striped pattern. All of these process chamber points PP are passed over little by little by a laser beam, which runs back and forth, always in a meandering manner, along irradiation paths PINS, PCON of predefined length, wherein the irradiation progresses in a direction SF. The width a of the strip SF is defined by the length of the individual irradiation paths PF, or vice versa. Usually, this strip is also referred to as a stripe, and the irradiation paths PINS, PCON are also referred to as hatches. To this end, the occupancy of the lowermost 8 bits, which contain the irradiation information EXP according to FIG. 5, is shown in FIG. 7 for the two process chamber points PPi, PPj.

As can be seen in FIG. 6, the process chamber point PPj is passed through only by irradiation paths PINS in which the laser is operated with the irradiation type "inskin", i.e. this process chamber point represents a region within the manufacturing products. Accordingly, of the lowermost 8 bits (see FIG. 7) of the supervisory value KW for this process chamber point PPj, only the lowermost bit is set to 1 and is used as a flag for "inskin" irradiation. The process chamber point PPi, by contrast, should also extend over an edge or beyond an edge of the manufacturing product (not shown as such), such that an irradiation path PINS with the laser in the "inskin" mode is provided initially, and then a further irradiation path PCON runs over this process chamber point PPi, in which the laser runs in the "contour" irradiation type. Accordingly, the first and fourth bit are set (see FIG. 7), since this shows that on the one hand an "inskin" irradiation type has occurred, but also on the other hand a "contour" irradiation type.

In the encoding according to FIG. 5 and FIG. 7, it is not shown for the process chamber point PPi situated at the edge of the manufacturing product whether irradiation of the "inskin" irradiation type occurred first, followed by irradiation with the "contour" irradiation type, or vice versa. This could be encoded in a further 8 bits, as is shown by way of example in FIG. 8. Here, 8 bits are additionally available and are used merely to encode the order. Here, the lowermost 8 bits are used to encode the order, and the irradiation types are encoded in the ninth to sixteenth bits, in the manner as described above for FIG. 7. As can be seen in FIG. 8, which likewise relates to the example according to FIG. 6, the first bit, corresponding to the inskin bit, has been set to the value 1 for the process chamber point PPi situated at the edge of the manufacturing product, in order to signal that "inskin" irradiation occurred first, followed by the further irradiation. Nothing has changed for the other process chamber point PPj, since here only "inskin" irradiation types were present anyway, and therefore all further bits for the signalling of the order (that is to say the first 8 bits) are set to the value 0. With an additional 8 bits of this kind, a temporal sorting of the irradiation types or the application of the irradiation types in a specific process chamber point in sufficient form is thus possible. These additional 8 bits can be made available for example by expanding the total supervisory value KW to 32 bits, or for example by omitting the object identification number or a lower bit number being sufficient for this object identification number, for example 7 bits plus 1 bit for signalling a part overlap.

By means of a simple rearrangement of the information in the bits in the supervisory values, other information can be highlighted when the process chamber supervisory data set is output without the supervisory values actually containing other information. To this end, a second example for a possible bit-wise encoding of supervisory data in a process chamber supervisory data set according to the invention is provided in FIG. 9. A specific example of the effect of this rearrangement in a presentation will then be explained later with reference to FIGS. 12 and 13.

Figure 9:
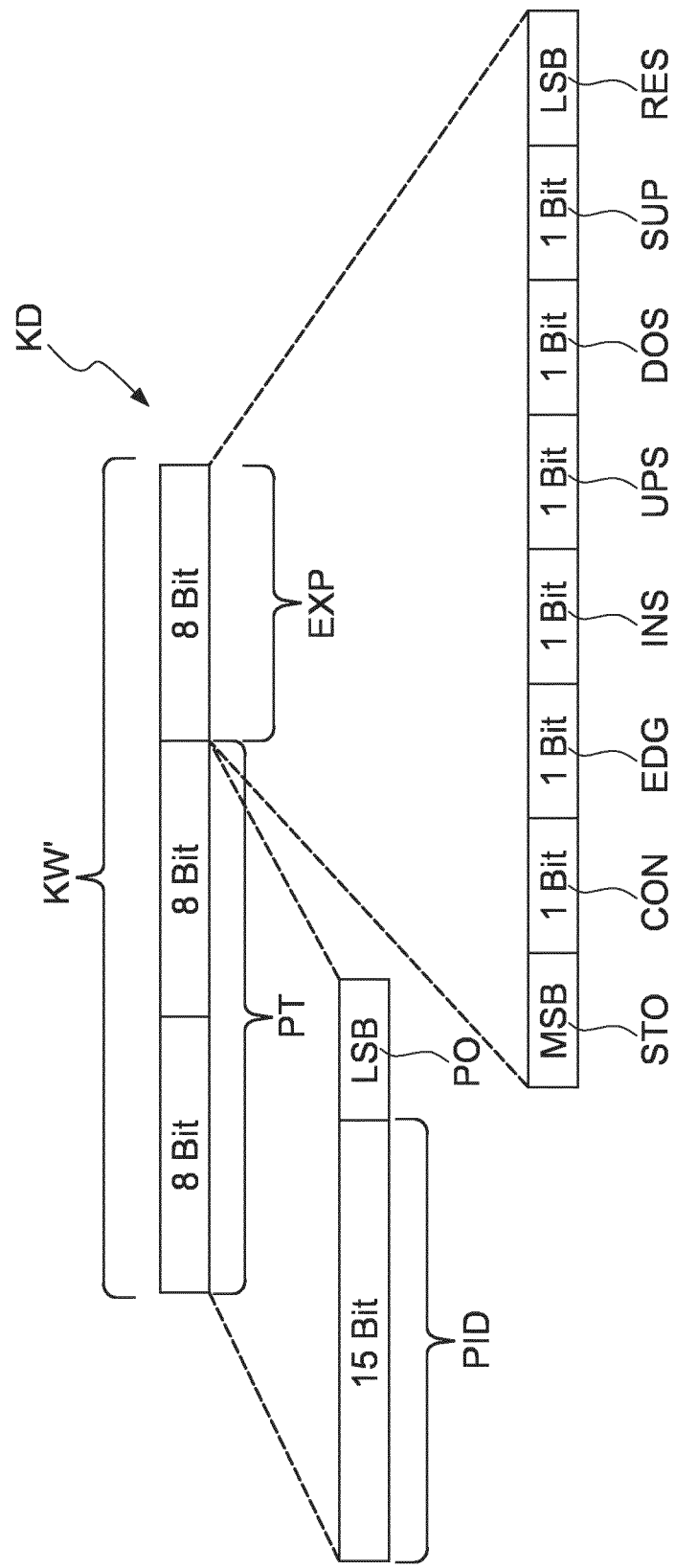
FIG. 9 shows a second example of a possible bit-wise encoding of supervisory data in a process chamber supervisory data set according to the invention.

FIG. 9 shows a supervisory value KW' for a process chamber point with an encoding very similar to that for the supervisory value KW in FIG. 5.

In contrast to the encoding in FIG. 5, however, the flag for the part overlap information PO has been set to the lowest-value bit (LSB: least significant bit) of the upper 16 bits of the information PT regarding the manufacturing product. The uppermost 15 bits are thus used to encode the object identification number PID. This would mean that, in the display of the image with 24-bit depth, a component part overlap would no longer be as clear to an observer, for example a user, as is the case in the encoding according to FIG. 5.

In addition, a bit shift in the lower 8 bits has occurred in the encoding according to FIG. 9. There, the reserve bit RES has been shifted to the lowest-value bit LSB, and the group of bits for the irradiation types CON, EDG, INS, UPS, DOS, SUP has been shifted upwardly by 1 bit. In addition, the bits for the individual irradiation types CON, EDG, INS, UPS, DOS, SUP have also been rearranged here. The "contour" irradiation type CON is now at the second-highest position (after the MSB), followed by the "edges" irradiation type EDG, then followed by the "inskin", "upskin" and "downskin" irradiation types INS, UPS, DOS in the lower bits, and in last position the "support" irradiation type SUP, which was arranged at the third-highest position in the encoding according to FIG. 5. The effect of this rearrangement in a visualisation is shown in a comparison of FIGS. 12 and 13.

Generally, a shift of a bit by one position to the left causes the value in the presentation to double. For the upper 16 bits, this means that parts with a lower object identification number will be displayed lighter, and adjacent parts will differ from one another to a greater extent. Accordingly, the exposure types in the lower 8 bits are each provided with a higher bit value and are therefore displayed lighter, whereas support structures with the "support" irradiation type are stored with a lower value and accordingly appear darker in the image.

In FIGS. 10 to 14 shown here, the brightness values have been shown in a reversed manner for reasons of clarity.

Figure 11:
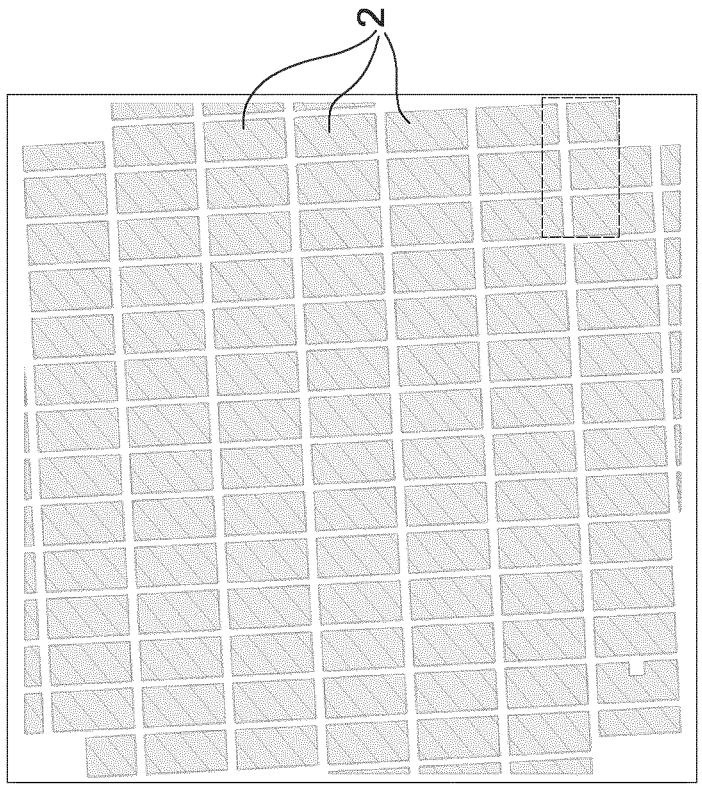
FIG. 11 shows a further example of the visual output (inverted) of part of the process chamber supervisory data set with an encoding according to FIG. 9 in the form of a layer image, now limited to the lower channel (i.e. the lower 8 bits), containing the irradiation information.
Figure 10:
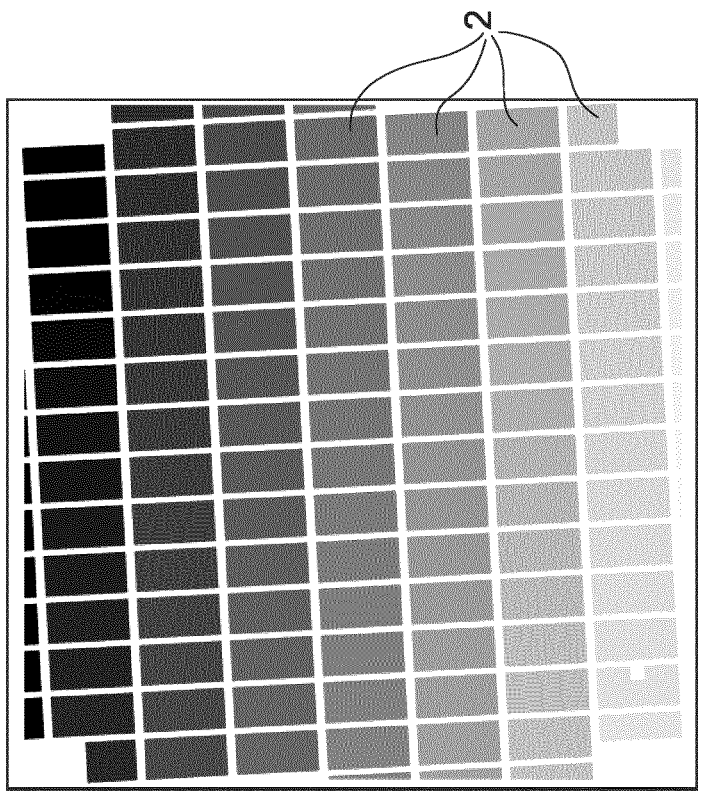
FIG. 10 shows an example of the visual output (inverted) of part of the process chamber supervisory data set with an encoding according to FIG. 9 in the form of a layer image, limited to the upper and middle channel (i.e. the upper 16 bits), containing the object identification number.

Firstly, however, examples of how a process chamber supervisory data set of any layer can be output in the form of a two-dimensional image in order to visualise the supervisory data or supervisory values or parts thereof in a spatially resolved manner (that is to say the individual process chamber points, corresponding to the pixels of the layer image) in an arbitrary image presentation program, will be provided with reference to FIGS. 10 and 11. Here, FIGS. 10 and 11 are based on an encoding of the characteristic values KW' as is shown in FIG. 9.

In FIG. 10 a layer image is shown, in which the upper and middle channel (i.e. the upper 16 bits) of the supervisory values KW' are output in the form of grey values. Since the object identification numbers are contained in these upper 16 bits, the individual manufacturing products 2, here test manufacturing products 2 in the form of adjacently arranged squares, which are manufactured in parallel in a manufacturing process, are shown primarily. The characteristic value between the squares is "0", and therefore the gaps are clearly visible. It can also be seen here that the brightness corresponds directly to the component identification number, and the squares become darker from bottom to top and from left to right.

FIG. 11, by contrast, shows a layer image formed from the lowermost 8 bits of the supervisory values KW' encoded in accordance with FIG. 9 (likewise in the form of grey values). In other words, a superimposition of the images 10 and 11 would give a layer image of the complete process chamber supervisory data set with the supervisory values KW' encoded in accordance with FIG. 9. Since the lowermost channel, i.e. the lowermost 8 bits, contain the irradiation information EXP, and the strip overlap information STO specifying whether or not there is an overlap is encoded in the highest-value bit MSB of the lowermost 8 bits, the overlap regions of the exposure strips running obliquely to the manufacturing products 2 can be seen particularly clearly. The peripheral object contours of each of the manufacturing products 2 are also clearly visible, since the second-highest bit is occupied by the "contour" irradiation type CON.

Figure 12:
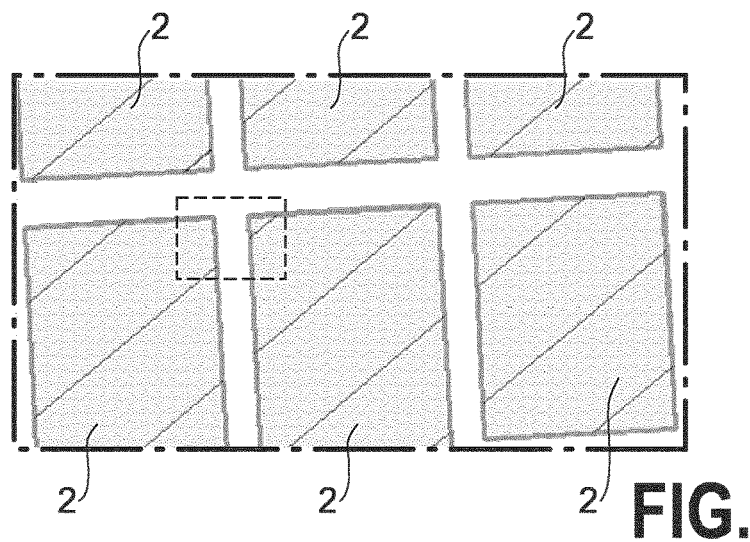
FIG. 12 shows an enlarged detail from the layer image in FIG. 11 (see marked area in FIG. 11)
Figure 13:
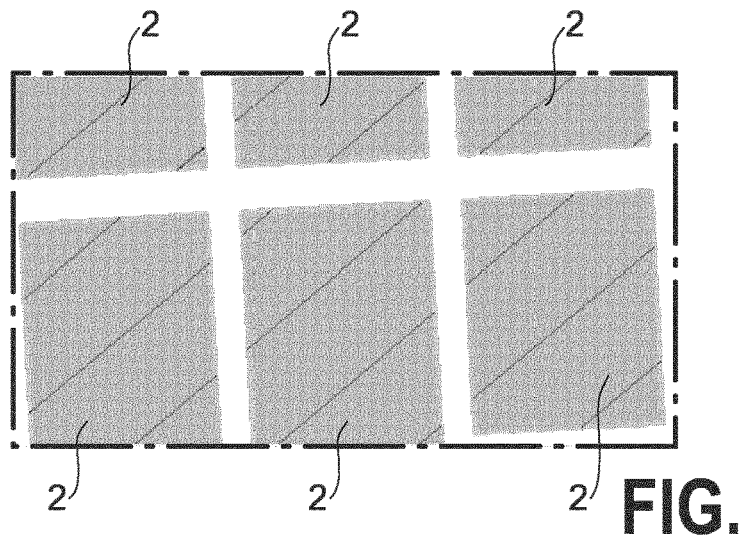
FIG. 13 shows a detail from a layer image as in FIG. 12 (again limited to the lower 8 bits), but here with an encoding according to FIG. 5.

The effect of the bit position on the presentation of a certain piece of information can be seen clearly from the enlarged detail from the layer image in FIG. 11 (see the marking in FIG. 11) shown in FIG. 12 in comparison with a corresponding detail in FIG. 13 (which relates to the same object structure, the same layer, the lower 8 bits and the same detail as the layer image detail in FIG. 12, but with the sole difference that the supervisory values KW of the process chamber supervisory data set were encoded in accordance with FIG. 5 and not in accordance with FIG. 9). It can thus be clearly seen in FIG. 13 that the contours of the individual objects or manufacturing products are significantly less pronounced than in the presentation according to FIG. 12, since the bits set when exposure in the "contour" irradiation type CON occurs is arranged in accordance with FIG. 5 only at the fourth-lowest position of the lower 8 bits instead of at the second-highest position. This is a good example of how certain parameters can be highlighted by the choice of the bit occupancy within the encoding of the supervisory value and the subsequent presentation. The presentation of the strip overlap, by contrast, has not changed in FIG. 13 in relation to FIG. 12, since the information regarding the strip overlap STO is still encoded in the highest-value bit of the lower 8 bits.

Figure 14:
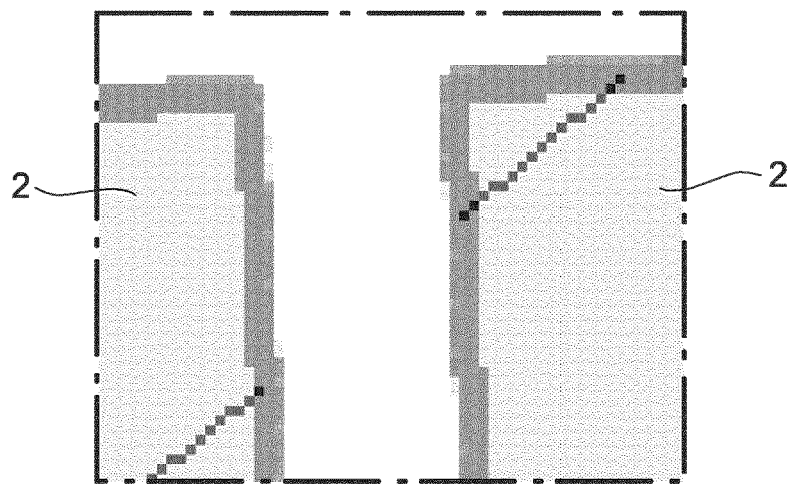
FIG. 14 shows a detail, enlarged further, from the layer image in FIG. 12.

On the basis of the further enlarged detail from the layer image in FIG. 12 shown in FIG. 14, it is additionally clear how supervisory values or a process chamber supervisory data set KDS can be formed as a whole from the exposure control data BS, which at least qualitatively represents the energy to be introduced at the various process chamber points, as a result of a specifically selected arrangement of the bits in the supervisory values of the process chamber supervisory data set KDS.

The corresponding "contour" irradiation type CON can indeed be selected in the contour regions, since these form the edges of the manufacturing products, such that less energy per process chamber point is introduced than in the interior of the manufacturing products, i.e. than with the "inskin" irradiation type. Nevertheless, the arrangement of the bits here means that the supervisory values in the contour regions are higher than in the interior of the manufacturing products, this being shown by the darker grey value in FIG. 14.

However, the bit arrangement of the encoding according to FIG. 9—strip overlap information STO at the uppermost position, contour CON at the second position, inskin INS at the fourth point—ensures that regions of an overlap of exposure strips are shown darker than contours of the component parts. Even more energy is introduced merely into the small-area overlap zones of contours and strip overlap regions, since here a laser scans, the corresponding process chamber points three times in total. If this type of overlap also was not stored at a dedicated bit position, the corresponding regions are particularly dark, since here the highest bit is set for the strip overlap information STO, and the second-highest it is set for the contour CON, whereby the increased energy input as compared to the "normal" contour region (that is to say without overlap) is symbolised or visualised indirectly at these positions. These effects achievable without great effort can also be used in a comparison with the corresponding process chamber sensor data set.

Lastly, it is once again noted that the apparatuses described above in detail are merely exemplary embodiments, which can be modified in a wide range of ways by a person skilled in the art without departing from the scope of the invention. Furthermore, the use of the indefinite article "a" or "an" does not rule out the fact that the features in question could also be provided in plural. The term "unit" also does not rule out the fact that said unit might consist of a plurality of cooperating sub-components, which might also be spatially distributed as appropriate.

REFERENCE LIST 1 apparatus for additive manufacture/laser apparatus
2 manufacturing product/object
3 process chamber/process space
4 chamber wall
5 container
6 container wall
7 working plane
8 construction field
10 support
11 base panel
12 construction platform
13 build-up material (in the container 5)
14 storage container
15 build-up material (in the storage container 14)
16 coater
17 radiation heater
20 irradiation apparatus/exposure apparatus
21 laser
22 laser beam
23 deflection apparatus
24 focusing device
25 in-coupling window
29 control unit
30 control device
31 supervisory device
32 supervisory data set determination device
33 quality data determination device
34 bus
35 sensor assembly/camera
40 terminal
a width
V vertical direction
H horizontal direction
M sensor value/measurement value
P position
BS irradiation control data
HS heating control data
PS process control data
QD quality data
ST coating control data
SB layer image
TS support control data
M1, M2 measurement signal
T1, T2, T3 tolerance range
Ty1, Ty2 spatial region
KD supervisory data
KW, KW' supervisory value
PO part overlap information
PP, PPi, PPj process chamber point
PT information regarding the manufacturing product
SF strip
CON contour irradiation type
DOS downskin irradiation type
EDG edges irradiation type
EXP exposure information
INS inskin irradiation type
KDS process chamber supervisory data
PID object identification number
RES reserve
SDS process chamber sensor data
STO strip overlap information
SUP support irradiation type
UPS upskin irradiation type
PCON contour irradiation path
PINS inskin irradiation path

The invention claimed is:

1. A method for supervising an additive manufacturing process for manufacturing a three-dimensional product by selectively solidifying build-up material in powder form in a process chamber, comprising:
   irradiating, for the purpose of solidifying, the build-up material in accordance with predefinable irradiation control data;
   generating a process chamber supervisory data set on the basis of the irradiation control data by encoding supervisory data process chamber point by process chamber point;
   determining quality data concerning the additive manufacturing process on the basis of the process chamber supervisory data set; and
   using the quality data for at least one of adjusting future additive manufacturing processes, analyzing the quality of the three-dimensional product solidified in the additive manufacturing process, and analyzing the quality of the additive manufacturing process itself.

2. The method according to claim 1 further comprising detecting a process chamber sensor data set, wherein the step of determining quality data includes comparing the process chamber supervisory data set with the process chamber sensor data set.

3. The method according to claim 1 further comprising determining location-dependent tolerance values on the basis of the process chamber supervisory data set.

4. The method according to claim 1, wherein the process chamber supervisory data set for a process chamber point comprises at least one of the following items of information:
   irradiation types applied or to be applied to the process chamber point,
   temporal order of the irradiation types applied or to be applied to the process chamber point,
   position of the process chamber point in relation to irradiation regions adjacent to one another or overlapping with one another,
   position of the process chamber point in relation to an overlap region of various beams,
   at least one parameter value, which represents at least one irradiation event occurring at this process chamber point,
   an order number, associated with the particular process chamber point, and/or a manufacturing product identification code.

5. The method according to claim 4 further comprising encoding the process chamber supervisory data set in an image format by assigning each process chamber point an image point with a supervisory value.

6. The method according to claim 5, wherein assigning of the supervisory values is performed in such a way that physical parameters are encoded in higher-value bits.

7. The method according to claim 4, wherein the process chamber supervisory data set has a spatial resolution which corresponds at least to a spatial resolution of the process chamber sensor data set, and wherein the spatial resolution of the process chamber supervisory data set is adapted to the spatial resolution of the process chamber sensor data set.

8. The method according to claim 4, wherein the process chamber supervisory data set is generated before or after execution of a manufacturing process to be supervised by the process chamber supervisory data set, and
wherein the process chamber supervisory data set can be modified during the manufacturing process if the process chamber supervisory data set is generated before execution of the manufacturing process.

9. The method according to claim 1 further comprising modifying irradiation control data on the basis of the quality data.

10. A supervisory device for an additive manufacture apparatus adapted to manufacture three dimensional products by selective solidification of build-up material in a powder form by irradiating the build-up material in accordance with predefinable irradiation control data, comprising:
a supervisory data set determination device configured to determine a process chamber supervisory data set on the basis of the irradiation control data;
a quality data determination device configured to determine quality data relating to the manufacturing of the three dimensional products on the basis of the process chamber supervisory data set; and
an output device that outputs the quality data for use in at least one of adjusting future additive manufacturing processes, analyzing the quality of the three-dimensional product solidified in the additive manufacturing process, and analyzing the quality of the additive manufacturing process itself.

11. A control device for an additive manufacture apparatus for the additive manufacture of three dimensional products with the supervisory device according to claim 10.

12. An additive manufacture apparatus for the additive manufacture of three dimensional products with the control device according to claim 11.

13. A non-transitory computer-readable medium storing a computer program executable by a programmable control device and/or a data processing device, the computer program comprising program code means for executing all of the steps of the method according to claim 1 when the computer program is executed on a control device.

* * * * *